United States Patent
Li et al.

(10) Patent No.: US 9,537,552 B2
(45) Date of Patent: Jan. 3, 2017

(54) METHOD AND APPARATUS FOR CHANNEL STATE INFORMATION BASED ON ANTENNA MAPPING AND SUBSAMPLING

(71) Applicant: Samsung Electronics Co., Ltd., Suwon-si, Gyeonggi-do (KR)

(72) Inventors: Yang Li, Plano, TX (US); Young-Han Nam, Plano, TX (US); Eko Onggosanusi, Allen, TX (US); Md. Saifur Rahman, Richardson, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/850,157

(22) Filed: Sep. 10, 2015

(65) Prior Publication Data

US 2016/0080052 A1 Mar. 17, 2016

Related U.S. Application Data

(60) Provisional application No. 62/049,881, filed on Sep. 12, 2014, provisional application No. 62/059,074, (Continued)

(51) Int. Cl.
*H04B 7/02* (2006.01)
*H04B 7/04* (2006.01)
(Continued)

(52) U.S. Cl.
CPC .......... *H04B 7/0456* (2013.01); *H04B 7/0626* (2013.01); *H04B 7/0639* (2013.01); *H04L 5/005* (2013.01)

(58) Field of Classification Search
CPC ...... H04L 1/0618; H04L 1/06; H04L 25/0204; H04L 27/2647; H04L 5/0007; H04L 27/2657; H04L 27/2662; H04L 5/0048; H04L 25/4902; H04L 1/0009; H04L 1/0041; H04L 25/49; H04B 7/0417; H04B 7/0669; H04B 3/54
(Continued)

(56) References Cited

U.S. PATENT DOCUMENTS

2013/0242902 A1  9/2013 Liu et al.
2013/0258964 A1  10/2013 Nam et al.
(Continued)

FOREIGN PATENT DOCUMENTS

CN    EP 2919506 A1 * 9/2015 ............... H04B 7/04

OTHER PUBLICATIONS

International Search Report dated Jan. 6, 2016 in connection with International Application PCT/KR2015/009642; 3 pages.
(Continued)

*Primary Examiner* — Zewdu Kassa

(57) ABSTRACT

Non-zero power channel state information reference signals (CSI-RS) are transmitted only on a subsampled pattern of antennas within an antenna array. Based on the transmitted CSI-RS, channel state information is determined for all antennas within the antenna array by, for example, precoder matrix indicator (PMI) interpolation or channel quality indicator (CQI) compensation. The determination of CSI for all antennas within the antenna array may be made by a user equipment receiving the subsampled CSI-RS or a base station transmitting the subsampled CSI-RS.

22 Claims, 17 Drawing Sheets

Related U.S. Application Data filed on Oct. 2, 2014, provisional application No. 62/062,620, filed on Oct. 10, 2014.

(51) Int. Cl.
    *H04B 7/06*     (2006.01)
    *H04L 5/00*     (2006.01)

(58) Field of Classification Search
    USPC ............... 375/267, 260, 259, 219, 295, 316
    See application file for complete search history.

(56) References Cited

U.S. PATENT DOCUMENTS

| | | |
|---|---|---|
| 2013/0308714 A1 | 11/2013 | Xu et al. |
| 2014/0192917 A1 | 7/2014 | Nam et al. |
| 2014/0198751 A1 | 7/2014 | Prasad et al. |
| 2015/0249972 A1* | 9/2015 | You .......................... H04L 5/001 370/254 |

OTHER PUBLICATIONS

Written Opinion dated Jan. 6, 2016 in connection with International Application PCT/KR2015/009642; 6 pages.

\* cited by examiner

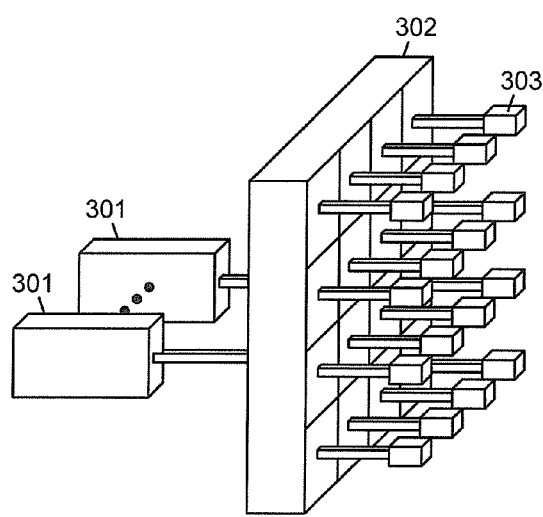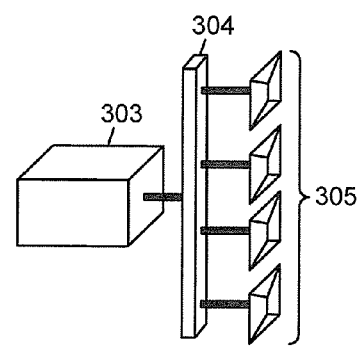
FIGURE 3
FIGURE 3A

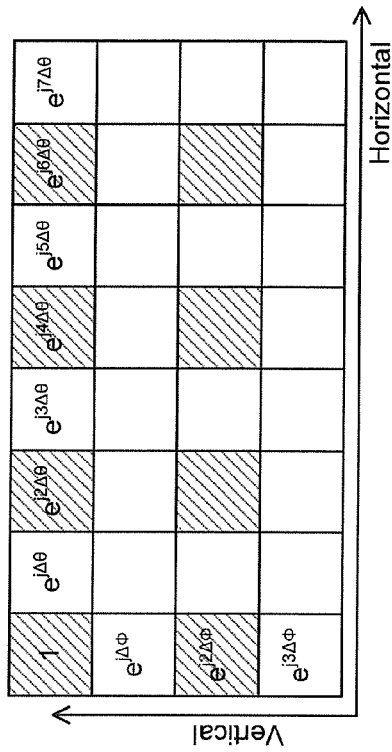
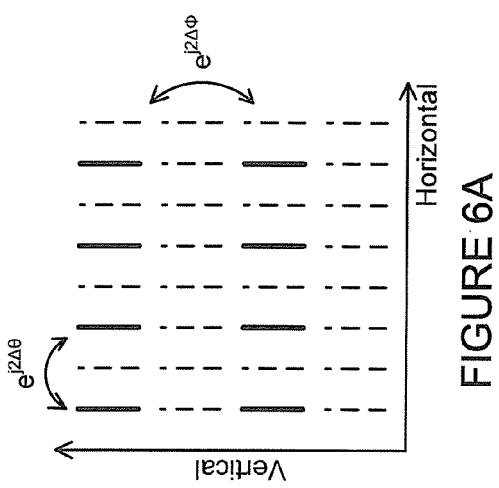
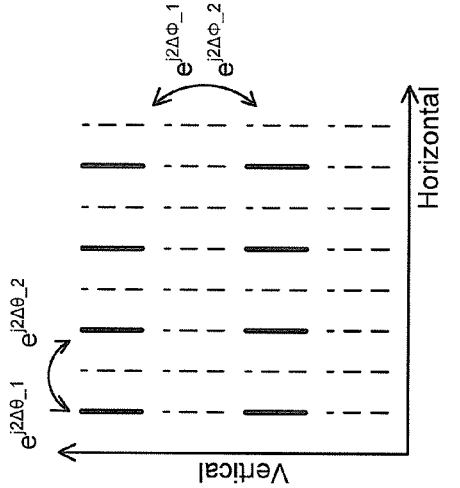
FIGURE 6B
FIGURE 8B
FIGURE 6A
FIGURE 8A

PATTERN 1  PATTERN 2  PATTERN 3  PATTERN 4

PATTERN 5  PATTERN 6  PATTERN 7  PATTERN 8

FIGURE 22

CSI Process 1   CSI Process 2       CSI Process 1   CSI Process 2

FIGURE 23A                          FIGURE 23B

Subframe *n*    Subframe *n+k*

Subframe n   Subframe n+k   Subframe n+k₁   Subframe n+k+k₂

METHOD AND APPARATUS FOR CHANNEL STATE INFORMATION BASED ON ANTENNA MAPPING AND SUBSAMPLING

This application claims priority to U.S. Provisional Patent Application No. 62/049,881, filed Sep. 12, 2014, entitled "METHODS AND APPARATUS FOR CHANNEL STATE INFORMATION BASED ON ANTENNA MAPPING AND SUBSAMPLING," U.S. Provisional Patent Application No. 62/059,074, filed Oct. 2, 2014, entitled "METHODS AND APPARATUS FOR CHANNEL STATE INFORMATION BASED ON ANTENNA MAPPING AND SUBSAMPLING," and U.S. Provisional Patent Application No. 62/062,620, filed Oct. 10, 2014, entitled "METHODS AND APPARATUS FOR ARRAY PATTERN SUBSAMPLING AND SIGNALING FOR WIRELESS COMMUNICATION." The above-identified patent documents are hereby incorporated by reference.

TECHNICAL FIELD

The present disclosure relates generally to channel state information in wireless communications systems, and more specifically to compression or puncturing of channel state information for appropriate propagation environments.

BACKGROUND

Scalable and frequency division duplex (FDD)-enabling channel state information (CSI) feedback for frequency division, multiple input multiple output (FD-MIMO) communications systems depends upon efficient quantization.

SUMMARY

Non-zero power channel state information reference signals (CSI-RS) are transmitted only on a subsampled pattern of antennas within an antenna array. Based on the transmitted CSI-RS, channel state information is determined for all antennas within the antenna array by, for example, precoder matrix indicator (PMI) interpolation or channel quality indicator (CQI) compensation. The determination of CSI for all antennas within the antenna array may be made by a user equipment receiving the subsampled CSI-RS or a base station transmitting the subsampled CSI-RS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 depicts a transceiver processing chain including an exemplary antenna array constructed for use within an exemplary wireless communication system that may employ channel state information based on antenna mapping and/or array pattern subsampling according to some embodiments of the present disclosure;

FIG. 3A depicts further details regarding the exemplary antenna array of FIG. 3;

FIGS. 6A and 6B depict an example of antenna subsampling and channel interpolation, respectively, for single polarized antennas and rank 1 transmission according to some embodiments of the present disclosure;

FIGS. 8A and 8B illustrate antenna subsampling and channel interpolation, respectively, for single polarized antennas and rank 2 transmission according to some embodiments of the present disclosure;

FIGS. 21A and 21B illustrate an example of RE mapping of hybrid CSI-RS ports according to one embodiment of the present disclosure;

FIG. 22 illustrates a plurality of exemplary array geometry/subsampling pattern according to embodiments of the present disclosure;

FIGS. 23A and 23B illustrate examples of one subsampling pattern per CSI process according to embodiments of the present disclosure;

DETAILED DESCRIPTION

Figure 1:
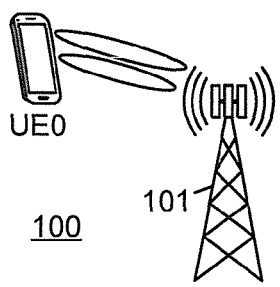
FIG. 1 illustrates an exemplary wireless communication system that may employ channel state information based on based on antenna mapping and/or array pattern subsampling according to some embodiments of the present disclosure.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein:

[REF1] 3GPP TS36.211, "Evolved Universal Terrestrial Radio Access (E-UTRA); Physical channels and modulation";

[REF2] 3GPP TS36.212, "Evolved Universal Terrestrial Radio Access (E-UTRA); Multiplexing and channel coding";

[REF3] 3GPP TS36.213, "Evolved Universal Terrestrial Radio Access (E-UTRA); Physical layer procedures";

[REF4] L. Vuokko, V.-M. Kolmonen, J. Kivinen, and P. Vainikainen, "Results from 5.3 GHz MIMO measurement campaign," presented at COST 273 TD(04)193, Duisburg, 2004; and

[REF5] Young-Han Nam, Boon Loong Ng, Krishna Sayana, Yang Li, Jianzhong Zhang, Younsun Kim and Juho Lee, "Full Dimension MIMO (FD-MIMO) for Next Generation Cellular Technology," Communications Magazine, IEEE, vol. 51, no. 6, pp. 172-179, June 2013.

A description of exemplary embodiments of the present disclosure is provided below. The text and figures of that description are provided solely as examples to aid the reader in understanding the disclosure, and are not intended and are not to be construed as limiting the scope of this disclosure in any manner. Although certain embodiments and examples have been provided, it will be apparent to those skilled in the art based on the description and figures herein that changes in the embodiments and examples shown may be made without departing from the scope of this disclosure.

LIST OF ACRONYMS

2D: two-dimensional
MIMO: multiple-input-multiple-output
SU-MIMO: single-user MIMO
MU-MIMO: multi-user MIMO
3GPP: 3rd Generation Partnership Project
LTE: long-term evolution
UE: user equipment
eNB: evolved Node B or eNodeB
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identifier
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel PDCCH: physical downlink control channel
PUSCH: physical uplink shared channel
PUCCH: physical uplink control channel
PRB: physical resource block
RRC: radio resource control
AoA: angle of arrival
AoD: angle of departure
SINR: signal-to-interference-plus-noise ratio
CW: codeword
RRC: remote radio control
D-BCH: dynamic broadcast channel
FDD: frequency division duplex
FD-MIMO: frequency division, multiple input, multiple output
C-RNTI: cell radio network temporary identifier The rapid growth of data traffic driven by mobile devices poses challenges on capacity of wireless networks. Multi-input-multi-output (MIMO) and multiuser MIMO (MU-MIMO) are key technologies introduced in the 3GPP LTE and LTE-Advanced (LTE-A) to improve spectral efficiency. In current MIMO systems, an evolved Node B (eNB) is usually equipped with a linear array with antenna elements placed in a horizontal line, and the eNB exploits spatial diversity in the azimuth (horizontal) domain. In contrast, deploying antennas vertically allows eNBs to utilize diversity in elevation domain by, e.g., elevation beamforming, achieving up to 30% gain in system capacity [REF1].

FIG. 1 illustrates a wireless communication system that may employ channel state information based on based on antenna mapping and/or array pattern subsampling according to some embodiments of the present disclosure. In the exemplary communications system 100 depicted, user equipment (UE) UE0 receives streams from evolved Node B (eNB) 101. eNB 101 multiplexes data streams intended for multiple UEs. The communication system thus consists of a downlink (DL), where signals are transmitted from eNB, base station (BS), NodeBs or transmission point (TP) to user equipment, and an uplink (UL), where signals are transmitted from UE to BS or NodeB. A UE, also commonly referred to as a terminal or a mobile station, may be fixed or mobile and may be a cellular phone, a personal computer device, etc. An eNB, which is generally a fixed station, may also be referred to as an access point or other equivalent terminology. DL signals include data signals conveying information content, control signals conveying DL Control Information (DCI), and Reference Signals (RS), which are also known as pilot signals. The eNB transmits data information or DCI through respective Physical DL Shared CHannels (PDSCHs) or Physical DL Control CHannels (PDCCHs). The eNB transmits one or more of multiple types of RS including a UE-Common RS (CRS), a Channel State Information RS (CSI-RS), and a DeModulation RS (DMRS). A CRS is transmitted over a DL system Bandwidth (BW) and can be used by UEs to demodulate data or control signals or to perform measurements. For CSI estimation corresponding to a number of transmit antenna ports, the eNodeB may transmit CSI-RS in addition to the CRS.

Figure 1A:
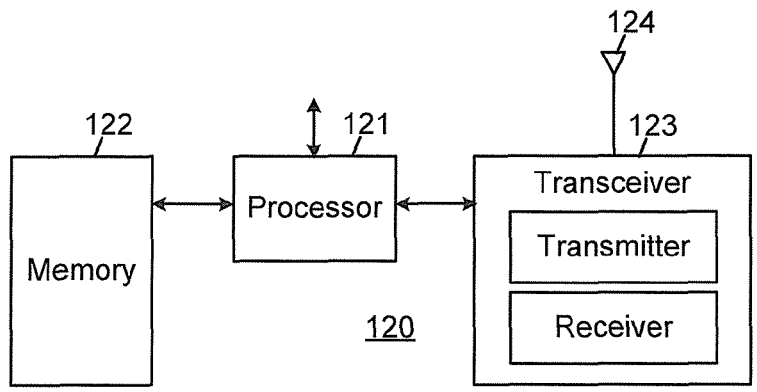
FIG. 1A depicts further details regarding the exemplary system of FIG. 1.

As shown in further detail in FIG. 1A, each system 120 for the UE (UE0) depicted in FIG. 1 and other, similar UEs (not shown) and for the eNB 101 depicted in FIG. 1 and other, similar eNBs (not shown) include: a processor 121, a memory 122, a transceiver 123 including a transmitter and a receiver, and an antenna array 124. The receiver and the transmitter (or transceiver 123) are each coupled to the antenna array for receiving or transmitting wireless signals, including reference signals such as CSI-RS. The controller or processor 121 is coupled to the receiver and the transmitter and performs one or more of the various computations or determinations described in further detail below, such as estimating one or more channels between the respective UE and the base station, deriving channel quality information for the channels using the reference signals and one or more of the processes described below, reporting at least the CQI and one or more indicators of precoding matrix selection(s) or antenna array subsampling parameters as described in further detail below, transmitting feedback including the CQI and/or PMI report as discussed in further detail below, or interpolating CQI/PMI as described below.

Figure 1B:
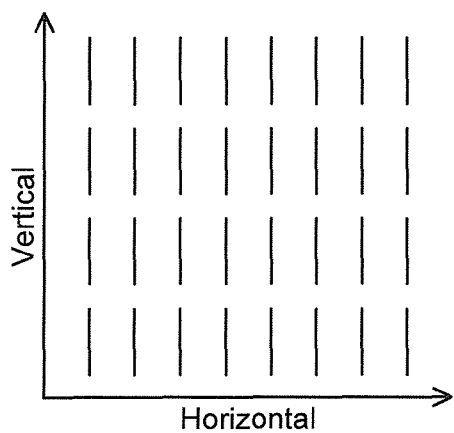
FIGS. 1B and 1C depicts details of antenna systems for the exemplary system of FIG. 1.
Figure 1C:
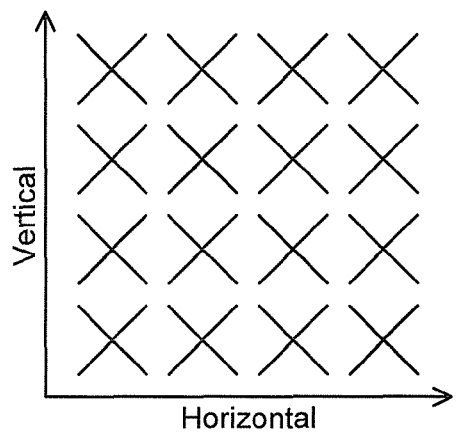

Recently full-dimensional MIMO (FD-MIMO) has emerged as a promising technology to significantly increase system capacity [REF2]. In FD-MIMO, an eNB deploys a large number of active antenna elements in a two-dimensional plane, i.e., a 2D active antenna array (AAA). FIGS. 1B and 1C show two AAA systems (single polarized and double polarized) having 32 antenna elements with 8 horizontal antenna elements per row and 4 vertical antenna elements per column. FIG. 1B illustrates an eight horizontal, four vertical (8(H)×4(V)) element single-polarized antenna array, and FIG. 1C an 8(H)×4(V) dual-polarized antenna array. With such antennas, the eNB can form beams in both horizontal and vertical domain, fully exploiting the spatial diversity, and is capable to support high-order MU-MIMO. To steer beams towards User Equipments (UEs), the eNB must acquire channel state information (CSI) of the UEs, which is typically obtained by downlink training (e.g., via CSI reference signal, or "CSI-RS") and uplink feedback of precoding matrix indicator (PMI) information and channel quality indicator (CQI) information in frequency division duplex (FDD) systems.

Currently, 3GPP Release 12 only supports up to 8 CSI-RS ports, meaning that the eNB can only obtain CSI for up to 8 antennas. Moreover, the current codebook in Release 12 is designed for uniform linear array (ULA) configurations, where all the antenna elements are placed in horizontal. Therefore, within the current specification it is challenging to benefit from 2D AAA in FD-MIMO, which uses much more than 8 antennas to perform beamforming in both horizontal and vertical domains. This disclosure proposes an innovative method to support FDD FD-MIMO operation with 2D AAA within 3GPP's current specification.

Figure 2:
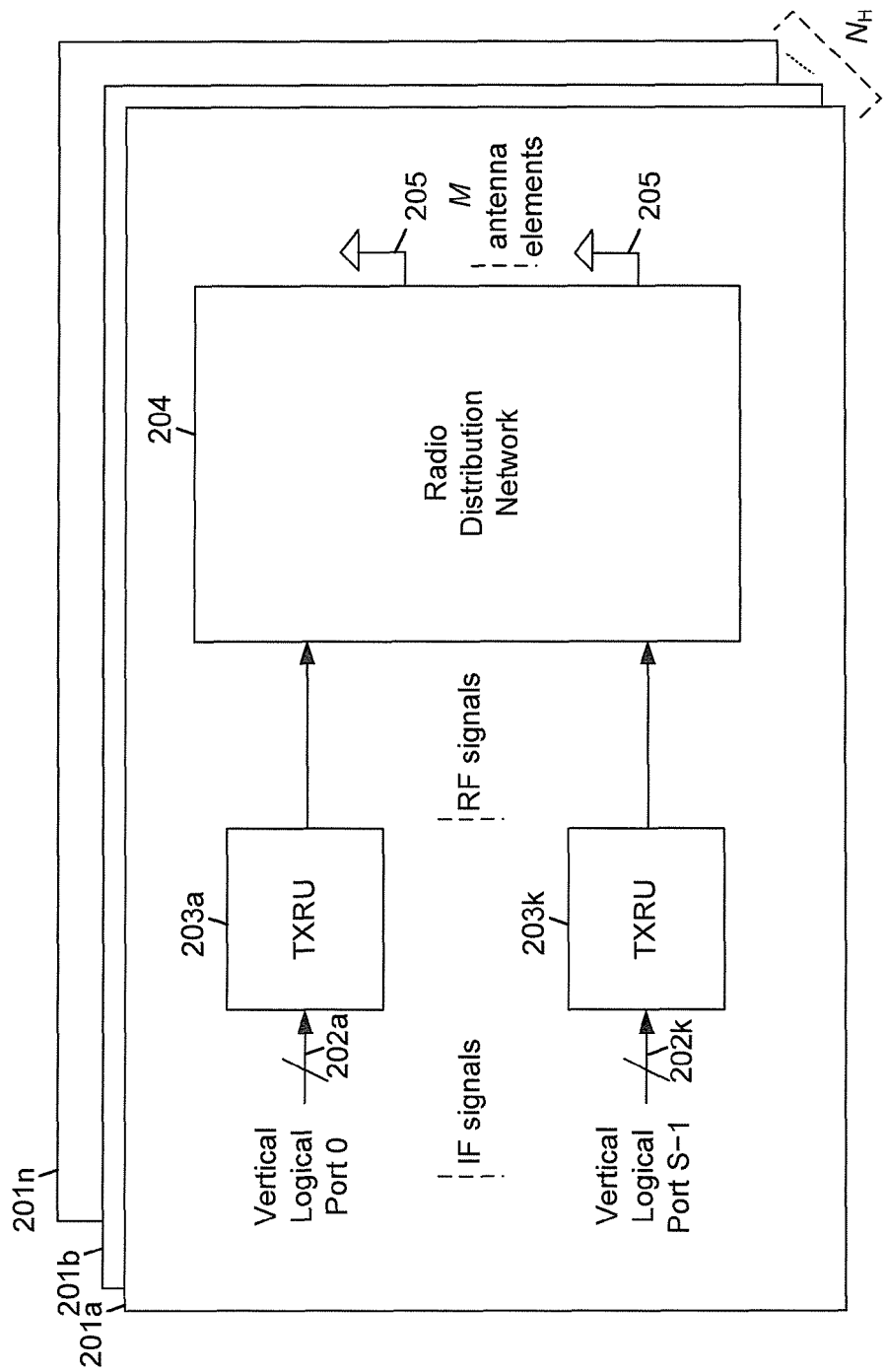
FIG. 2 depicts logical port to antenna port (antenna element) mapping within an exemplary wireless communication system that may employ channel state information based on antenna mapping and/or array pattern subsampling according to some embodiments of the present disclosure.

FIG. 2 depicts logical port to antenna port (antenna element) mapping an exemplary wireless communication system that may employ channel state information based on antenna mapping and/or array pattern subsampling according to some embodiments of the present disclosure. In the figure, a number $N_H$ of instances 201a to 201n of a signal path are provided, each including connections to K antenna ports 202a to 202k, transmission routing units (TxRUs) 203a to 203k, a radio distribution network 204 (e.g., of a size M×K), and M antenna elements 205. RF signals on the logical ports 0 through K are fed into the radio distribution network 204. The output signals of radio distribution network 204 are connected to a set of M physical antenna elements 205. In some embodiments, M corresponds to a total number of antenna elements on a substantially vertical axis. In some embodiments, M corresponds to a ratio of a total number of antenna elements to S, a total number of antenna elements on a substantially vertical axis, wherein M and S are chosen to be any positive non-zero integer.

FIG. 3 depicts a transceiver processing chain including an exemplary antenna array constructed for use within an exemplary wireless communication system that may employ channel state information based on antenna mapping and/or array pattern subsampling according to some embodiments of the present disclosure. FIG. 3A depicts further details regarding the exemplary antenna array of FIG. 3. The data stream units 301, precoding unit 302, and transceiver (TRx) units 303 depicted in FIG. 3 are implemented for a portion of one of the $N_H$ signal paths in FIG. 2. The transceiver processing chain comprises 16 transceiver (TRx) units 303 and 64(=16×4) antenna elements, with each TRx antenna unit 303 coupled by a feed network 304 to 4 antenna elements 305. In some embodiments of the present disclosure, a TRx may refer to: a logical antenna or an antenna port, in which case that TRx may feed multiple antenna elements; or physical antennas, in which case the TRx is one-to-one mapped to one antenna element. In some embodiments of the present disclosure, signals on an antenna port can be distributed on one or more TRx's, with application of antenna virtualization precoding.

In FIG. 3, the antenna elements are placed in a 2D, vertically-oriented, rectangular space, where 4 antenna elements are placed per row, and 16 antenna elements are placed per column; correspondingly the TRx antenna units are placed in a 2D array. A signal going through the TRx 303 is fed to 4 antenna elements 305 via feed network 304. A TRx antenna unit 303 comprises a transceiver, feed network 304 and the four antenna elements 305. K data streams are precoded to generate 16 signal streams to be transmitted on 16 TRx units, respectively. In one example, the 16 signals are generated by multiplying a k-th precoding vector of length 16×1 to a k-th data stream of length 1×L, for each k=1, . . . , K, and then add up all the K signals of size 16×L. Mathematically the 16×L signal matrix, say X, on the 16 TRx is:

$$X = WS = \begin{bmatrix} w_{1,1} & \cdots & w_{1,K} \\ \vdots & \ddots & \vdots \\ w_{16,1} & \cdots & w_{16,K} \end{bmatrix} \begin{bmatrix} s_{1,1} & \cdots & s_{1,L} \\ \vdots & \ddots & \vdots \\ w_{K,1} & \cdots & w_{K,L} \end{bmatrix},$$

wherein W is a precoder matrix comprising K precoding (column) vectors of 16×1 for the K streams and S is a signal matrix comprising K signal (row) vectors of 1×L for the K streams. It is noted that FIG. 3 is just an example to illustrate the transceiver processing chain, and other transceiver processing chains with different number of components can be constructed without departing from the principles of the present disclosure.

In some embodiments. N number of TRX are one-to-one mapped to N number of antenna elements.

In some embodiments, N number of antenna ports are one-to-one mapped to N number of TRX.

In some embodiments, the number of antenna ports is an integer multiple of that of TRX.

In some embodiments, the number of TRX is an integer (or n) multiple of that of antenna ports.

In some embodiments, a virtualized TRX (V-TRX) consists of N number of TRXs. A signal stream is multiplied by a virtualization precoding vector of size N×1 and then distributed on the N TRXs comprising the V-TRX.

The invention exploits statistical correlations among signals emitted on or received from the TRX's (which mean logical, or physical antennas or antenna ports or V-TRXs) that are imposed by the propagating channel and precoding codebook structures in the current LTE specifications. In some embodiments of the current invention, the eNB derives CSIs associated with a number of V-TRXs, based on CSI feedback (e.g., RI, PMI and CQI) whose corresponding CSI-RS ports are transmitted on a fewer number of V-TRXs.

The following precoding can be performed according to the derived (and a larger number of) V-TRXs, so that the system performance may be improved. One exemplary derivation is obtained via interpolation and extrapolation at the eNB. This methodology facilitates improved TX beamforming performance with little or no additional standardization support. The aforementioned subset of antenna elements can be predetermined or adapted in time.

Figure 4:
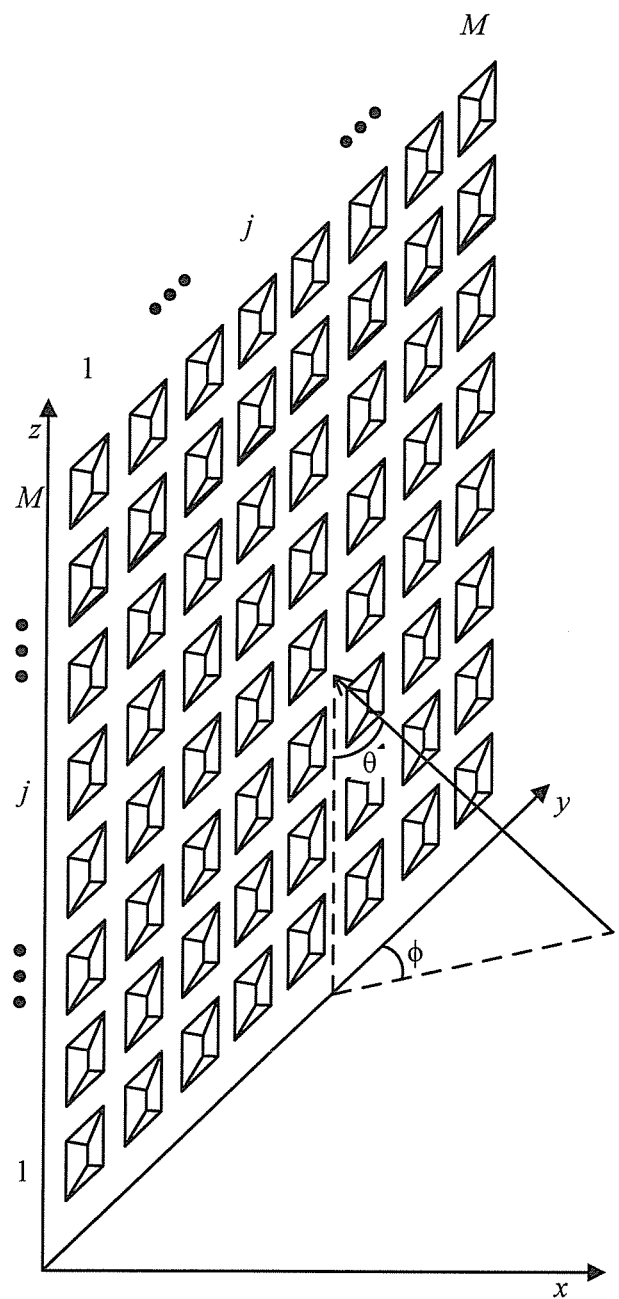
FIG. 4 illustrates a two-dimensional antenna array in the base station of an exemplary wireless communication system that may employ channel state information based on antenna mapping and/or array pattern subsampling according to some embodiments of the present disclosure.

FIG. 4 illustrates a 2D array in the eNB of an exemplary wireless communication system that may employ channel state information based on antenna mapping and/or array pattern subsampling according to some embodiments of the present disclosure, for purposes of explaining the array response in line-of-sight (LoS). The 2D array comprises MN antenna elements: N equally spaced columns of antenna array, each comprising M equally spaced antenna elements placed on a rectangle. In the figure, the vertical and horizontal antenna spacing between two adjacent antennas is denoted as $d_z$ and $d_y$. In FIG. 4, an antenna is connected to a TRX, and it may constitute physical antennas, logical antennas, or antenna ports. An incident wave from a UE at a far field is considered in the figure. Given the incident wave with azimuth angle φ and elevation angle θ defined as shown in FIG. 4 and a wavelength corresponding to an operating carrier frequency λ, the field response at antenna (n,m) is:

$$h_{nm} = h_{11} \exp\left( \frac{j2\pi(m-1)d_z \cos\theta}{\lambda} - \frac{j2\pi(n-1)d_y \sin\theta \cos\phi}{\lambda} \right) \quad (1)$$

where $h_{11}$ is the field response of the antenna (1,1). In this case, the field responses of the MN antennas are highly correlated (can be determined by the equation above) and the eNB can estimate the channels of all the antennas by estimating a channel coefficient on one antenna and a phase progression between two adjacent vertically/horizontally placed antennas. In equation (1), vertical and horizontal phase progression respectively corresponds to $d_z \cos\theta$ and $d_y \sin\theta \cos\theta$.

In cellular communication systems, eNB may obtain the channel response (e.g., $h_{nm}$) either via UL channel sounding relying on channel reciprocity or via feedback from a UE. The channel response obtained via feedback from UE is often quantized, to maintain the feedback overhead in the system. In some embodiments, UE is configured to quantize the channel response by means of a preferred precoding vector (or matrix), e.g., PMI.

For example, the UE quantizes the field responses of the MN antennas by means of a NM×1 preferred precoding vector, $v(q_z, q_y)$, with $q_y=0, \ldots, Q_y-1$ and $q_z=0, Q_z-1$:

$$v(q_z, q_y) = v_z(q_z) \otimes v_y(q_y) = \begin{bmatrix} v_{z,1} v_y(q_y) \\ v_{z,2} v_y(q_y) \\ \vdots \\ v_{z,M} v_y(q_y) \end{bmatrix} \quad (2)$$

where $v_z(q_z)$ [$v_{z,1}$, $v_{z,1}$, . . . $v_{z,M}$]$^t$, $v_y(q_y)$=[$v_{y,1}(q_y)$, $v_{y,2}(q_y)$, . . . $v_{y,M}(q_y)$]$^t$, $v_{y,n}(q_y)$=exp(j(n−1)2πq$_y$/Q$_y$)=exp(j(m−1)2πq$_z$/Q$_z$) and Q$_y$ and Q$_z$ are positive integers specifying a number of quantization levels. Here, Q$_y$=s$_y$N and Q$_z$=s$_z$M, where s$_y$ and s$_z$ are integers. In particular, when s$_y$=s$_z$=1, equation (2) is a Kronecker product of two discrete Fourier transform (DFT) vectors of length N and M, representing elevation and azimuth channel responses. In addition, $2\pi q_y/Q_y$ can be denoted as $\Delta\phi(q_y)$, and $2\pi q_z/Q_z$ can be denoted as $\Delta\theta(q_z)$, where $\Delta\phi(q_y)$ and $\Delta\theta(q_z)$ are respectively used for quantizing vertical and horizontal phase progression (i.e., $d_y \sin\theta \cos\phi$ and $d_z \cos\theta$).

Figure 5:
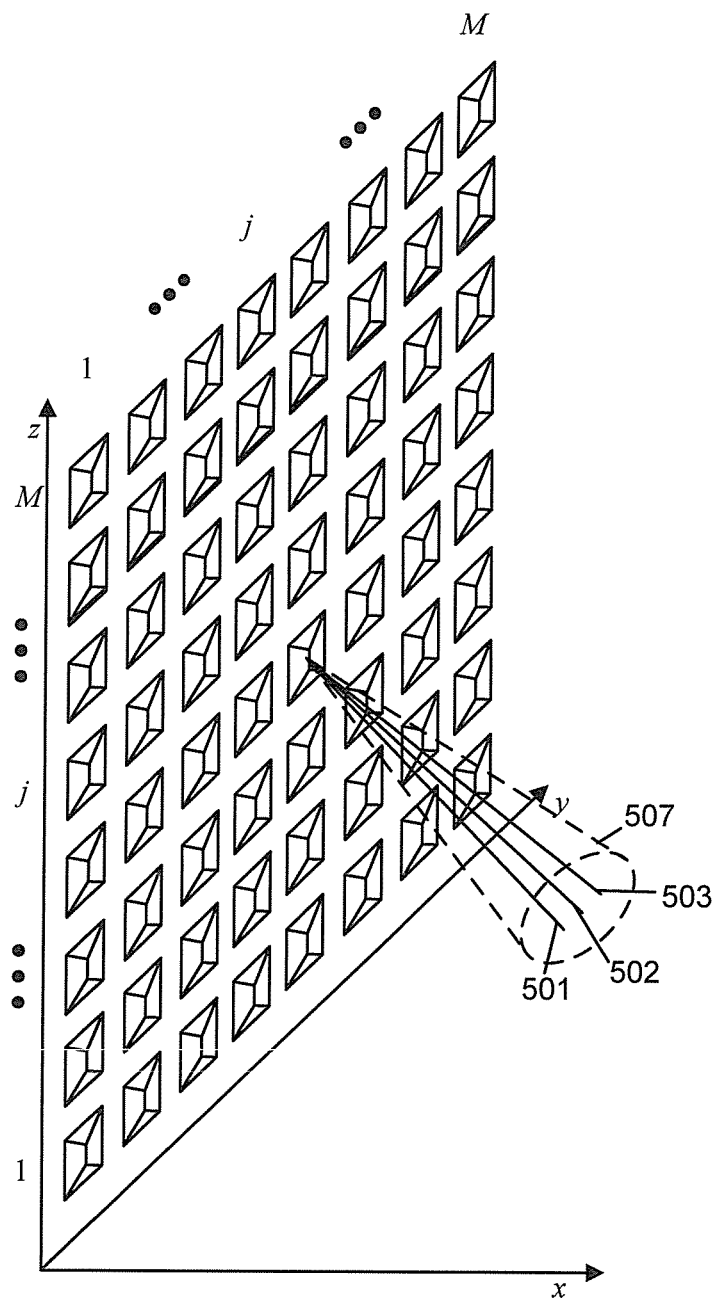
FIG. 5 is an illustration of subband discrete Fourier transform vector selection in cases of small angular spread.

In some channel conditions, multiple incident waves from a UE arrive at different angles, where the waves have different powers and delays. If the angular spread of the multipath components is small, then rank-1 transmission may be preferred by the UE and a single vector in a format of equation (2) can be selected for beamforming in each subband and signaled as PMI feedback, where the direction of the vector can "best" match the composite response of the multipath components, as illustrated in FIG. 5. FIG. 5 is an illustration of subband DFT vector selection in cases of small angular spread. Multi-path components 501, 502 and 503 are contained within the DFT vector 504, which quantizes as a cluster multi-paths centered around the ($\phi$, $\theta$) direction.

FIGS. 6A and 6B depict an example of antenna subsampling and channel interpolation for single polarized antennas and rank 1 transmission according to some embodiments of the present disclosure. To identify DL precoders and MCS, eNB should estimate a preferred precoding vector for a UE on each subband (e.g., the vector of equation (2) corresponding to a cluster (or a path) in angle direction of $\theta_1$ and $\phi_1$).

In some embodiments, the eNB transmits CSI-RS from all the antennas and then, out of the UE feedback, horizontal phase progression $\Delta\theta$ and vertical phase progression $\Delta\phi$ can be estimated.

In some embodiments, in order to maintain small CSI-RS overhead, the eNB transmits CSI-RS only on a subset of antennas as illustrated in FIG. 6A (hence the term "antenna subsampling" or "antenna array subsampling"). If the eNB transmits CSI-RS only from those antenna elements depicted by the heavy, solid lines and not on antenna elements depicted by the thinner, dashed lines in FIG. 6A, i.e., from every other antenna in alternate rows of the antenna array, then the effective antenna spacing with regard to the transmitted CSI-RS in both horizontal and vertical is doubled. Upon receiving the CSI-RS associated with a given subsampling pattern, a UE in the channel condition illustrated in FIG. 5 would estimate horizontal and vertical phase progression and feed back a preferred precoding vector (i.e., PMI). The horizontal and vertical phase progressions of the preferred precoding vector respectively corresponds to $2\Delta\theta$ and $2\Delta\phi$.

Upon receiving the PMI feedback from the UE, the eNB interpolates and estimates the channel state information (CSI) feedback (RI, PMI, and CQI) and/or the preferred precoding vector on all the antennas illustrated in FIG. 6B, including those with diagonal hatching on which CSI-RS were transmitted and those with no shading or hatching on which no CSI-RS was transmitted. In determining the interpolation, the precoding weight for antenna (n,m), $w_{nm}$, is equal to:

$$w_{nm} = e^{j((m-1)\Delta\theta + (n-1)\Delta\phi)}.$$

During eNB channel reconstruction, antennas represented by blocks with diagonal hatching may employ the phase from the PMI, while the remaining antennas (represented by unshaded blocks with no hatching) employ a phase determined by interpolation.

In case eNB also receives CQI feedback corresponding to the preferred precoding vector on the subsampled antenna ports, the eNB estimates the channel quality on the all the antenna ports, with applying correct beamforming gain after the interpolation. In FIGS. 6A and 6B, the total number of subsampled antenna ports is 8, but the total number of antenna ports at the eNB is 32. Then, eNB can estimate the receiver SINR when the all antenna ports are used for DL beamforming, by multiplying 4 (=32/8) to the receiver SINR corresponding to the feedback CQI. It is noted that the scaling factor 4 is obtained by taking the ratio of the number of total antenna ports (TRXs) and the number of CSI-RS antenna ports used in DL transmissions. The estimated receiver SINR with all antenna-port DL beamforming is then used for scheduling/precoder selection and link adaptation, including adaptive modulation and coding.

In some embodiments, applying interpolation or channel reconstruction, the eNB estimates channels (or a preferred precoding vector) for all the antennas (or V-TRXs) for beamforming or precoding. As illustrated in FIGS. 6A and 6B, although the eNB transmits only 8 CSI-RS, the eNB can reconstruct channels for all 32 antennas, and performs precoding using 32 antennas (V-TRXs) utilizing the reconstructed channel vector or matrix.

In some embodiments, the eNB configures two CSI processes for a UE via higher layer, such that the UE estimates and reports azimuth and elevation channel states (CQI/PMI/RI, where PMI captures phase progressions) separately. In one such example, a first CSI process comprises a first CSI-RS and a first CSI-IM, which the UE uses to estimate and report PMI/CQI/RI for azimuth channels capturing horizontal phase progression and a co-phase (denoted respectively as H-PMI/H-CQI/H-RI or HPMI/HCQI/HRI) and a second CSI comprises a second CSI-RS and a second CSI-IM, which the UE uses to estimate and report PMI/CQI/RI for elevation channels capturing vertical phase progression (denoted respectively as V-PMI/V-CQI/V-RI or VPMI/VCQI/VRI). In these embodiments, if the corresponding (or the most recently reported) RI is one, the CQI index (iCQI) represents an MCS index and a coding rate for one CW. If the corresponding (or the most recently reported) RI is two or more, the iCQI represents a pair of MCS index and a coding rate for two CW.

BS Implementation to Derive Composite CSI for Downlink Transmissions Out of the UE Feedback Based Upon the Two CSI Processes In some embodiments of the present disclosure, the received H-PMI/H-CQI/H-RI and V-PMI/V-CQI/V-RI can be used for link adaptation in downlink transmissions in the eNB or BS. For single-user transmission, when H-RI=V-RI=1, the BS determines a precoder for the downlink transmission by applying a Kronecker product of two precoders corresponding to H-PMI and V-PMI. For example, the precoding matrix is found by taking Kronecker product of PMI precoder, d V-PMI precoder, $w=[w_1, w_2, \ldots w_{N_H}]^t \in C^{N_H \times 1}$ and V-PMI $v=[v_1, v_2, \ldots v_{N_V}]^t \in C^{N_V \times 1}$. In this case, when $N_H=2$, $N_V=2$, HRI=1 and VRI=1, the Kronecker product would be calculated as in the following:

$$HPMI \otimes VPMI = w \otimes v = \begin{bmatrix} w_1 \\ w_2 \end{bmatrix} \otimes \begin{bmatrix} v_1 \\ v_2 \end{bmatrix} = \begin{bmatrix} w_1 v_1 \\ w_1 v_2 \\ w_2 v_1 \\ w_2 v_2 \end{bmatrix},$$

$$VPMI \otimes HPMI = v \otimes w = \begin{bmatrix} v_1 \\ v_2 \end{bmatrix} \otimes \begin{bmatrix} w_1 \\ w_2 \end{bmatrix} = \begin{bmatrix} v_1 w_1 \\ v_1 w_2 \\ v_2 w_1 \\ v_2 w_2 \end{bmatrix}.$$

For the MCS selection, the BS needs to come up with an SINR to derive MCS, corresponding to the Kronecker-product precoder out of H-CQI and V-CQI. When assuming that the channel response matrix h at a UE receiver antenna can be approximated by the Kronecker product of a horizontal channel vector $h_H$ and a vertical channel vector $h_V$: $h=h_H \otimes h_V$, which is $1 \times (N_H N_V)$. Then the signal power for each Rx antenna when applying the Kronecker precoder $w \otimes v$ can be calculated as:

$$P = h(w \otimes v) = (h_H \otimes h_V) \cdot (w \otimes v) = (h_H \otimes w) \cdot (h_V \otimes v) = P_H \cdot P_V$$

where $P_H = (h_H \otimes w)$ and $P_V = (h_V \otimes v)$. H-CQI and V-CQI can be considered as quantized values for SINR of horizontal and vertical component channels estimated with corresponding CSI-RS and CSI-IM:

$$SINR_H = P_H/(I+N)_H, \text{ and}$$

$$SINR_V = P_V/(I+N)_V.$$

One the other hand, the SINR of the Kronecker product channel is:

$$SINR = P_H \cdot P_V/(I+N) P_H \cdot P_V/(I+N)$$

where (I+N) should reflect the composite interference, which may or may not be aligned with one or more of $(I+N)_H$ and $(I+N)_V$. In order to facilitate the BS to derive SINR out of the UE feedback, two alternative methods can be considered.

In one method (UE reports I+N), the UE is configured with a CSI-IM, which the UE uses to derive and report interference power (I+N) to the BS. The report can be a higher-layer signaling similar to RSRP reporting, or a PHY-signaling similar to CQI reporting. The CSI-IM for this purpose can be the first CSI-IM, or the second CSI-IM, or another CSI-IM separately configured by the BS.

In another method (network cooperation to blank CSI-IM REs of one of the two CSI processes), the BS configures the first and the second CSI-IM in such a way that one of $(I+N)_H$ or $(I+N)_V$ is small as compared to the other. For example, the BS may configure the first CSI-IM such that the UE can estimate interference; and the BS may configure neighboring transmission points not to transmit signals in the second CSI-IM REs; in which case $(I+N)_H$ will capture overall interference, and $(I+N)_V$ will be small and negligible. Then, the BS can simply multiply the two SINR, $SINR_H$ and $SINR_V$ to derive the composite SINR: $SINR = SINR_H \cdot SINR_V$, and the composite SINR can be used for deriving the MCS for the UE.

In another method, the eNB estimates and interpolates the phase progression based on the specific antenna-subsampling pattern for CSI-RS transmission. For example, as shown in FIGS. 6A and 6B, because the antenna spacing for CSI-RS transmission is twice as wide as that of DL data transmission, the phase progression will be half of the value derived from the PMI.

Although the methods in this embodiment are described with an assumption of rank-1 transmission, the principle straightforwardly applies to other rank transmissions than rank-1.

Figure 7:
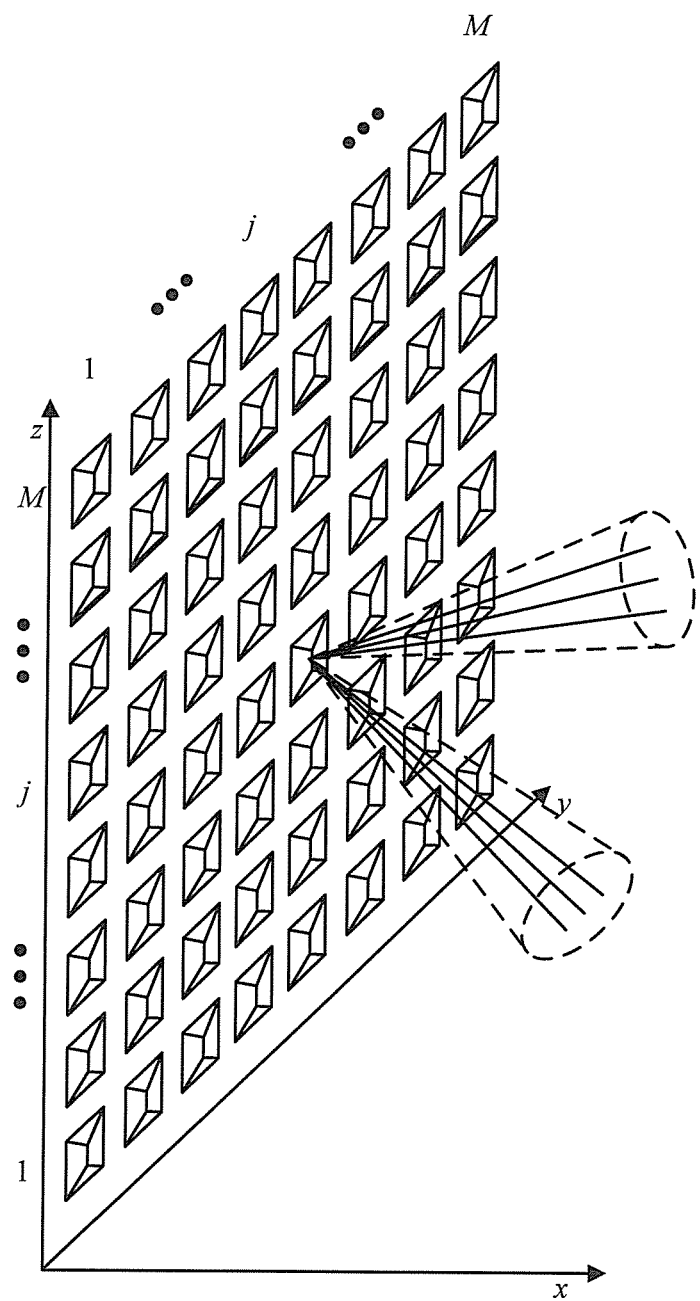
FIG. 7 illustrates multipath components having two dominant clusters for a link associated with a base station and a mobile station.

In some wireless link channel conditions, the angular spread is large and the composite spatial channel response may not be precisely captured by a single DFT vector. In this case, it is possible to represent the overall channel (per subband) by two or more DFT vectors so that eNB can perform high rank transmission (e.g., rank is two). FIG. 7 illustrates subband DFT vector (PMI) selection in large angular spread conditions. FIG. 7 illustrates two dominant clusters comprising wireless link channel conditions, where each cluster comprises a plurality of multi-path components with one cluster capable of being quantized by a DFT vector centered at $(\theta_1, \phi_1)$ and the other cluster capable of being quantized by a DFT vector centered at $(\theta_2, \phi_2)$, such that the phase angles of the two DFT vectors are determined by the two pairs of cluster angles: $(\theta_1, \phi_1)$ and $(\theta_2, \phi_2)$.

When the multipath components have two dominant clusters for a link associated with the eNB and a UE as illustrated in FIG. 7, the UE is likely to select two precoding vectors (e.g., rank 2 PMI precoder), one per cluster. When eNB transmits CSI-RS from all the antennas, and the UE would prefer two phase progressions of $(\Delta\theta_1, \Delta\phi_1)$ and $(\Delta\theta_2, \Delta\phi_2)$ in horizontal and vertical dimensions.

FIGS. 8A and 8B illustrate antenna subsampling and channel interpolation for single polarized antennas and rank 2 transmission according to some embodiments of the present disclosure. As with FIG. 6A, the eNB transmits CSI-RS only from those antenna elements depicted by the heavy, solid lines in FIG. 8A and not on antenna elements depicted by the thinner, dashed lines. If the eNB transmits CSI-RS from antennas depicted by the heavy, solid lines in FIG. 8A, i.e., from every other antenna in alternate rows of the antenna array, then the effective antenna spacing with regards to the transmitted CSI-RS in both horizontal and vertical is doubled. Upon receiving the CSI-RS, a UE in the channel condition illustrated in FIG. 7 would estimate horizontal and vertical phase progression and feed back a preferred precoding matrix, having two columns (i.e., PMI). The two pairs of horizontal and vertical phase progressions of the preferred precoding matrix respectively correspond to $(2\Delta\theta_1, 2\Delta\phi_1)$ and $(2\Delta\theta_2, 2\Delta\phi_2)$.

Applying the principles described above, the present disclosure devises a number of methods that can operate within the current Long Term Evolution (LTE) specifications, such as $3^{rd}$ Generation Partnership Project (3GPP) LTE Release 11 or above, to support precoding and beam-forming using more than 8 antennas as well as in a 2D array pattern. The challenges are:

The current LTE codebooks only support 1D uniform linear array and cannot be readily used to quantize a 2D array; and eNBs may be equipped with dual-polarized antennas, where each polarization has almost independent channel response, and therefore a co-phasing is required between two polarization.

These challenges may be overcome in the manner described below. To interpolate channel responses among antennas, the eNB must know three types of variables: vertical phase progression(s) $\Delta\theta$, horizontal phase progression(s) $\Delta\phi$, and a cophase $\phi$ between the two polarizations. Specifically, for the dual polarized antenna at the position (n,m), i.e., the m-th row and n-th column, the two channel responses can be represented as:

$$h_{n,m,1} = h_{1,1,1} \exp\left(\frac{j(m-1)d_z \cos\theta}{\lambda} - \frac{j(n-1)d_y \sin\theta \cos\phi}{\lambda}\right), \text{ and}$$

-continued $$h_{n,m,2} = \varphi h_{1,1,1} \exp\left(\frac{j(m-1)d_z\cos\theta}{\lambda} - \frac{j(n-1)d_y\sin\theta\cos\phi}{\lambda}\right),$$

where $h_{1,1,1}$ is the response for the polarization 1 at the position (1,1) and $\phi$ is the co-phasing factor (or the ratio) of the polarization 2 and polarization 1, e.g., $\phi = h_{1,1,2}/h_{1,1,1}$.

In some embodiments, an eNB configures a UE with 2 CSI processes, a first CSI process with 4 or 8 antenna ports (associated with the horizontal dimension) and a second CSI process with 2, 4 or 8 antenna ports (associated with the vertical dimension). For each CSI process, CSI-RS ports will be virtualized (i.e., a certain weight vector is applied) and then mapped to a subset of, or even all of, the physical antennas shown in FIG. 7. Based on PMI feedback of CSI process 1 and CSI process 2, the eNB can estimate a horizontal phase progression, a vertical phase progression, a cophasing factor, or any combination of these variables, and reconstruct channel responses for all the antennas.

Figure 9:
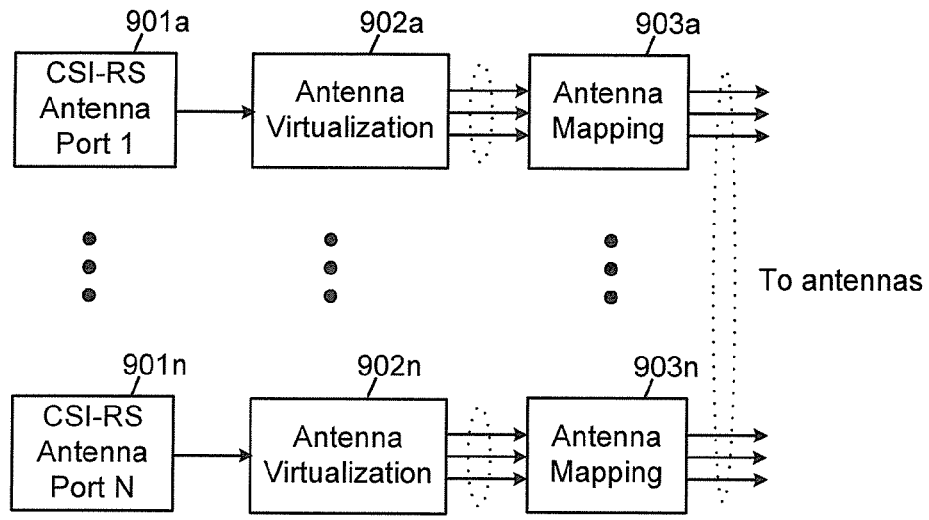
FIG. 9 is a block diagram of channel state information reference signal transmission and antenna mapping (subsampling) according to embodiments of the present disclosure.

FIG. 9 is a block diagram of CSI-RS transmission and antenna mapping (subsampling) according to embodiments of the present disclosure. The antenna subsampling 900 within the eNB includes CSI-RS antenna port 1 901a through CSI-RS antenna port N 901n, each respectively coupled to an instance of an antenna virtualization circuit 902a to 902n, which are in turn each coupled respectively to an instance of an antenna mapping circuit 903a to 903n. The outputs of antenna mapping circuits 903a to 903n are coupled to antennas within the array described above.

TABLE 1

Codebook for transmission on antenna ports {0,1} and for CSI reporting based on antenna ports {0,1} or {15,16}.

| Codebook index | Number of layers υ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

For transmission on four antenna ports $p \in \{0, 1, 2, 3\}$, and for the purpose of CSI reporting based on four antenna ports $p \in \{0, 1, 2, 3\}$ or $p \in \{15, 16, 17, 18\}$, the precoding matrix is selected from TABLE 2 or a subset thereof. The quantity $W_n^{(s)}$ denotes the matrix defined by the columns given by the set $\{s\}$ from the expression $W_n = I - 2u_n u_n^H / u_n^H u_n$, where I is the 4×4 identity matrix and the vector $u_n$ is given below (and by Table 6.3.4.2.3-2 of TS 36.211).

TABLE 2

Codebook for transmission on antenna ports {0, 1, 2, 3} and for CSI reporting based on antenna ports {0, 1, 2, 3} or {15, 16, 17, 18}.

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (1+j)/\sqrt{2}\ -j\ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1\ (-1+j)/\sqrt{2}\ j\ (1=j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1\ -1\ 1\ 1]^T$ | $W_8^{(1)}$ | $W_8^{(12)}/\sqrt{2}$ | $W_8^{(128)}/\sqrt{3}$ | $W_8^{(1284)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

To better understand the process of eNB antenna interpolation, details of exemplary codebooks are first presented.

2 Tx and 4 Tx Codebook:

For transmission on two antenna ports p, $p \in \{0,1\}$, and for the purpose of CSI reporting based on two antenna ports $p \in \{0,1\}$ or $p \in \{15,16\}$, the precoding matrix W(i) is selected from TABLE 1 or a subset thereof. For the closed-loop spatial multiplexing transmission mode defined in [REF4], the codebook index 0 is not used when the number of layers is v=2.

Of a particular interest is the first 8 elements in TABLE 2, which form eight 4-DFT vectors. These eight 4-DFT vectors represent 8 overlapping beams (8 equally-spaced beams with 45° spacing) which are suitable for uniform linear arrays. For typical 2D rectangular arrays (e.g., FIG. 1 or FIG. 10), this set of 8 vectors (or a subset thereof) can be used for either horizontal or vertical dimensions.

8 Tx Codebook:

TABLE 3 and TABLE 4 are codebooks for rank-1 and rank-2 (1-layer and 2-layer) CSI reporting for UEs configured with 8 Tx antenna port transmissions. To determine a CW for each codebook, two indices, i.e., $i_1$ and $i_2$ have to be selected. In these precoder expressions, the following two variables are used:

$$\varphi_n = e^{j\pi n/2}, \text{ and}$$

$$v_m = [1\ e^{j2\pi m/32}\ e^{j4\pi m/32}\ e^{j6\pi m/32}]^T.$$

TABLE 3 is a codebook for 1-layer CSI reporting using antenna ports 15 to 22:

TABLE 3

Codebook for 1-layer CSI reporting using antenna ports 15 to 22

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$.

If the most recently reported RI=1, m and n are derived with the two indices $i_1$ and $i_2$ according to TABLE 3, resulting in a rank-1 precoder:

$$W_{m,n}^{(1)} = \frac{1}{\sqrt{8}} \begin{bmatrix} v_m \\ \varphi_n v_m \end{bmatrix}.$$

TABLE 4 is a codebook for 2-layer CSI reporting using antenna ports 15 to 22:

If the most recently reported RI=2, m, m' and n are derived with the two indices $i_1$ and $i_2$ according to TABLE 4, resulting in a rank-2 precoder:

$$W_{m,m',n}^{(2)} = \frac{1}{4} \begin{bmatrix} v_m & v_{m'} \\ \varphi_n v_m & -\varphi_n v_{m'} \end{bmatrix}.$$

It is noted that $W_{m,m',n}^{(2)}$ is constructed such that it can be used for two different types of channel conditions that facilitate a rank-2 transmission.

One subset of the codebook associated with $i_2=\{0, 1, \ldots, 7\}$ comprises codewords with m=m'm=m', or the

TABLE 4

Codebook for 2-layer CSI reporting using antenna ports 15 to 22

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 19 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$.

same beams ($v_m$) are used for constructing the rank-2 precoder:

$$W^{(2)}_{m,n,n} = \frac{1}{4}\begin{bmatrix} v_m & v_m \\ \varphi_n v_m & -\varphi_n v_m \end{bmatrix}.$$

In this case, the two columns in the 2-layer precoder are orthogonal (i.e., $[v_m \ \phi_n v_m]^H \cdot [v_m \ -\phi_n v_m]=0$), owing to the different signs applied to $\phi_n$ for the two columns. These rank-2 precoders are likely to be used for those UEs that can receive strong signals along two orthogonal channels generated by the two differently polarized antennas.

Figure 10:
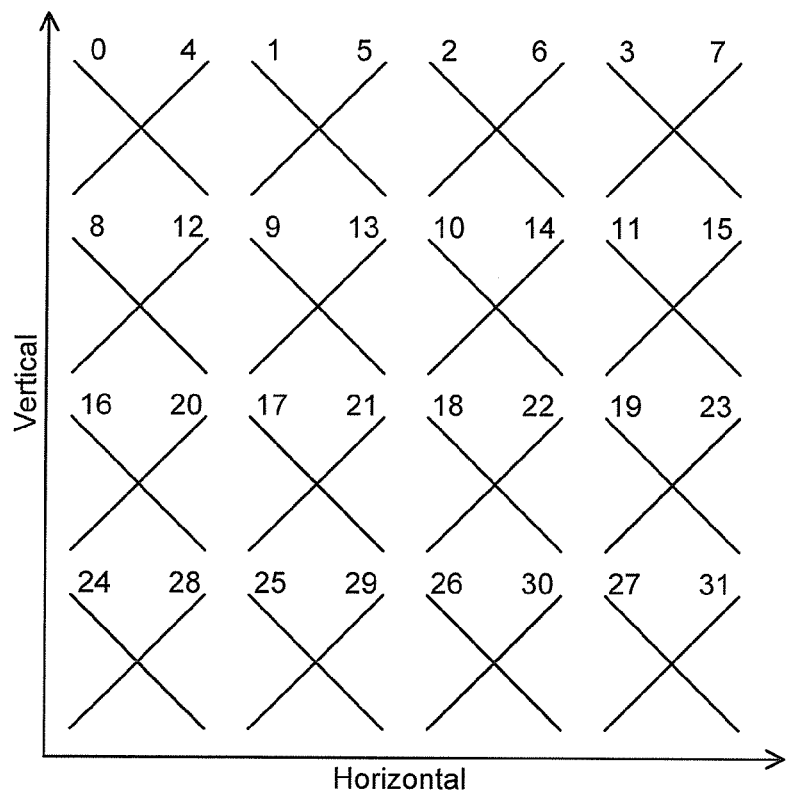
FIG. 10 represents a dual-polarized, thirty-two antenna, two-dimensional antenna array constructed according to some embodiments of the present disclosure.

FIG. 10 represents a dual-polarized 32 antenna 2D antenna array constructed according to some embodiments of the present disclosure. The numbers on top of antennas in FIG. 10 are referred to as antenna indices. The 32 antenna array comprises 4 columns of cross-polarized (x-pol) antenna array, where each x-pol antenna array comprises 4 x-pol elements placed on a substantially vertical line. The 2D antenna array is constructed from 16 dual-polarized antenna elements arranged in a 4×4 rectangular format. In this example, each labeled antenna element is logically mapped onto a single antenna port. In general, one antenna port may correspond to multiple antenna elements (physical antennas) combined via a virtualization weight. This 4×4 dual polarized array can then be viewed as a 16×2=32-element array of antenna elements. The vertical dimension (consisting of 4 rows) facilitates elevation beamforming in addition to the azimuthal beamforming across the horizontal dimension (consisting of 4 columns of the dual polarized antennas). MIMO precoding in Rel.12 LTE standardization (per TS36.211 section 6.3.4.2, 6.3.4.4, and TS36.213 section 7.2.4) was largely designed to offer precoding gain for one-dimensional antenna array. While fixed beamforming (i.e., antenna virtualization) can be implemented across the elevation dimension, it is unable to reap the potential gain offered by the spatial and frequency selective nature of the channel. Note that the embodiments illustrated according to FIG. 10 can be easily extended to other antenna configurations by applying the same principles illustrated by the embodiments described below.

In embodiments below, antenna virtualization examples are illustrated for CSI processes 1 and 2, and corresponding eNB's methods of estimating downlink CSI, i.e., deriving azimuthal and elevation phase progression, and co-phase for x-pol.

It is noted that the antenna virtualization examples are for illustration purpose only, and it should be understood that the same eNB's methods can be used even if another antenna virtualization method is used for each of CSI processes 1 and 2.

Embodiment 1-1

CSI Process 1 with 8 CSI-RS and CSI Process 2 with 2 CSI-RS

In one embodiment, eNB configures UE with 2 CSI processes: one with 8 antenna ports and the other with 2 antenna ports.

Figure 11A:
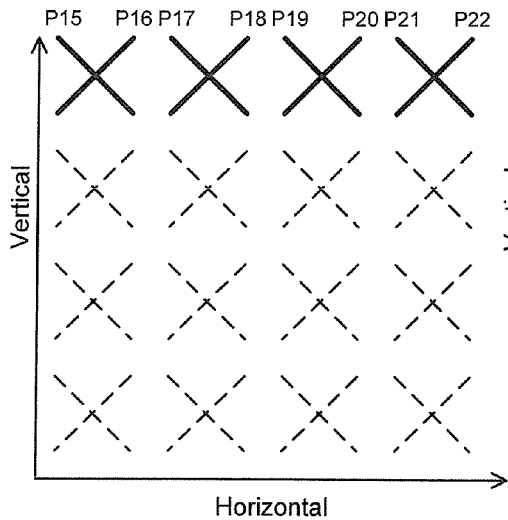
FIGS. 11A and 11B illustrate a channel state information reference signal antenna virtualization and mapping (subsampling) pattern on antenna ports for a two-dimensional antenna array according to some embodiments of the present disclosure.
Figure 11B:
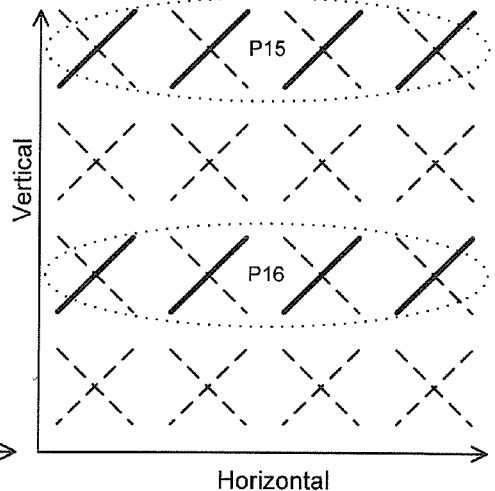

FIGS. 11A and 11B illustrate a CSI-RS antenna virtualization and mapping (subsampling) pattern on antenna ports for a 2D antenna array according to some embodiments of the present disclosure. FIGS. 11A and 11B depict an antenna virtualization and mapping (subsampling) pattern for 8 CSI-RS plus 2 CSI-RS.

In FIG. 11A, eight CSI-RS for CSI process 1 are mapped on 8 antennas comprising a first row of the 2D array (the heavy, solid lines), using the eight antenna ports shown. No CSI-RS are transmitted on the remaining antennas (shown in thinner, dashed lines). In FIG. 11B, on the other hand, two CSI-RS for CSI process 2 are mapped on 8 antennas using two antenna ports (P15, P16) with a same polarization comprising the first and the third rows of the 2D array. Furthermore, to construct 2 CSI-RS antenna ports for CSI process 2, four antennas in each row are grouped together (as shown by the dotted lines), wherein a virtualization precoder is applied on the four antennas comprising a CSI-RS antenna port.

Upon receiving the CSI-RS configured based upon these two CSI processes, UE feeds back H-PMI/H-CQI/H-RI for CSI process 1, and V-PMI/V-CQI/V-RI for CSI process 2. Upon receiving these CSI on subsampled antennas, eNB further processes the CSI to obtain CSI for all the antennas used for DL transmissions.

In some cases, both H-RI=V-RI=1. In this case, according to CSI process 1, eNB receives two PMI indices $i_1$ and $i_2$ from the UE according to TABLE 3. Based on the UE feedback, eNB obtains $w_{m,n}^{(1)}$, which corresponds to a preferred beam direction $v_m$ in the horizontal (azimuth) domain, and co-phasing factor $\phi_n$ between the two different polarizations:

$$\phi_n = e^{j\pi n/2}, \text{ and}$$

$$v_m = [1 \ e^{j2\pi m/32} \ e^{j4\pi m/32} \ e^{j6\pi m/32}]^T.$$

In this case, the horizontal phase progression is $\Delta\phi=2\pi m/32$. Furthermore, according to CSI process 2, eNB receives a PMI index mapping a precoding vector according to TABLE 1, which equivalently indicates that the phase progression (preferred beam direction) in vertical (elevation) domain is $2\Delta\theta=\{0, \pi/2, \pi, 3\pi/2\}$, or $\Delta\theta=\{0, \pi/4, \pi/2, 3\pi/4\}$. Equivalently, define: $U_k^{(1)}=[1 \ u_k^1 \ u_k^2 \ u_k^3]^T$, where $u_k=e^{-i(k-1)\pi/4}$, k={0, 1, 2, 4}. Then, the eNB constructs a preferred precoder for the UE on the all Tx antennas, a length 32 vector, as:

$$W^{(1)}_{m,n,k} = \frac{1}{\sqrt{4}} U_k^{(1)} \otimes W^{(1)}_{m,n} = \frac{1}{\sqrt{4}} \begin{bmatrix} u_k^{(0)} W^{(1)}_{m,n} \\ u_k^{(1)} W^{(1)}_{m,n} \\ u_k^{(2)} W^{(1)}_{m,n} \\ u_k^{(3)} W^{(1)}_{m,n} \end{bmatrix}.$$

It is noted that a rank-2 precoder on the all Tx antennas can be constructed according to the same principle, when H-RI=2 and V-RI=1.

The embodiment just described can be extended to other antenna configurations by transmitting CSI-RS with different antenna subsampling pattern. For example, for antenna configuration 64 Tx with 16×4 (e.g., 16 antennas horizontally placed in a row and 2 antennas vertically placed in a column), the CSI process 1 can be transmitted every other column. The effective horizontal antenna spacing is $2d_y$ and the eNB derives the horizontal phase progression $2\Delta\phi=2\pi m/32$, that is $\Delta\phi=2\pi m/64$. The rest of the operations are the same as in the antenna configuration shown in FIG. 10.

Embodiment 1-2

Variations and Generalizations of Embodiment 1-1

Figure 12A:
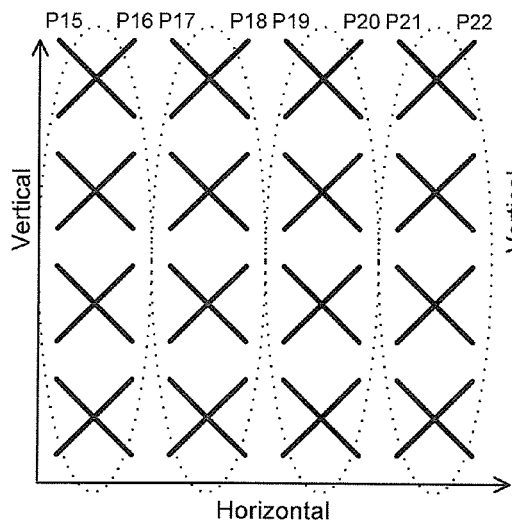
FIGS. 12A and 12B illustrate an alternate channel state information reference signal antenna virtualization and mapping (subsampling) pattern on antenna ports for a two-dimensional antenna array according to some embodiments of the present disclosure.
Figure 12B:
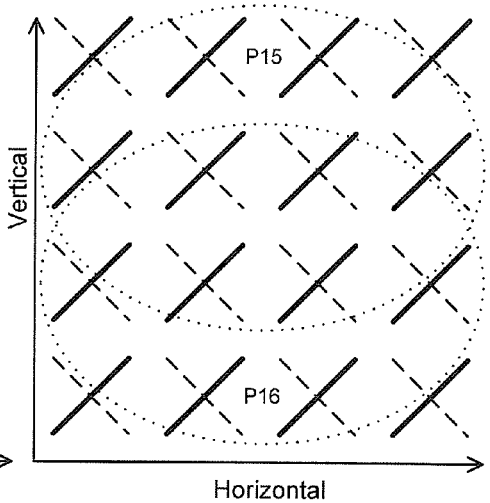

FIGS. 12A and 12B illustrate CSI-RS virtualization and mapping on antenna ports comprising the 2D array according to some embodiments of the present disclosure. FIGS. 12A and 12B depict an antenna virtualization and mapping (subsampling) pattern for 8 CSI-RS plus 2 CSI-RS.

In FIG. 12A, 8 CSI-RS for CSI process 1 are mapped on all the 4 columns of x-pol antennas of the 2D array, with each CSI-RS antenna port P15 through P22 comprises 4 antennas with a same polarization in a column of the antennas. In FIG. 12B, on the other hand, 2 CSI-RS for CSI process 2 are mapped on 16 antennas with a same polarization of the 2D array, with a first CSI-RS antenna port comprises top three rows of antennas, and a second CSI-RS antenna port comprises bottom three rows of antennas. In this case, the two rows of antennas in the middle are commonly used for both CSI-RS antenna ports P15 and P16. For constructing every CSI-RS, antenna virtualization precoding is applied to the elements comprising the CSI-RS.

Note that the two ports in CSI process 2 has an equivalent antenna spacing $d_z$, the same distance between two rows, which is different from $2d_z$ (or $2d_y$) as in Embodiment 1-1. Other possible subsampling patterns are also possible as long as the corresponding interpolation method accounts for the pattern. One benefit of antenna virtualization is to increase the radiated power from the antennas by allowing all the antenna transmitting.

The eNB channel reconstruction is similar to Embodiment 1-1, except that upon receiving one of the PMI vector in the CSI process 2, the eNB will derive a different phase progression (preferred beam direction) in vertical (elevation) domain as compared with Embodiment 1-1, because the vertical antenna spacing between two ports is different. In this example, $\Delta\phi=\{0, \pi/2, \pi, 3\pi/2\}$, or equivalently: $U_k^{(1)}=[1\ u_k^1\ u_k^2\ u_k^3]^T$, where $u_k=e^{-i(k-1)\pi/4}$, $k=\{0, 1, 2, 4\}$. The rest of the precoder construction for 32 Tx in this embodiment follows from Embodiment 1-1.

Figure 13A:
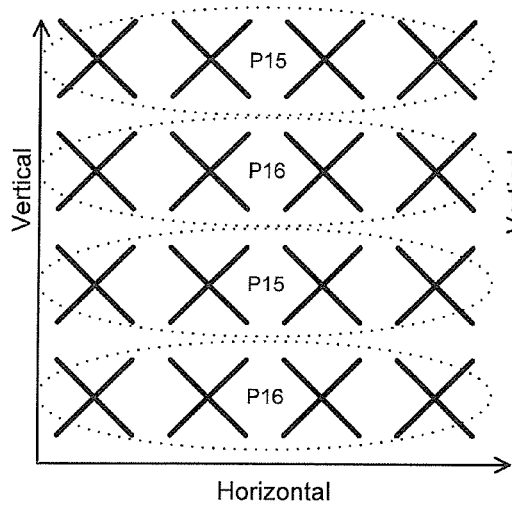
FIGS. 13A and 13B illustrate two variations of antenna virtualization for a channel state information process utilizing two antenna ports according to some embodiments of the present disclosure.
Figure 13B:
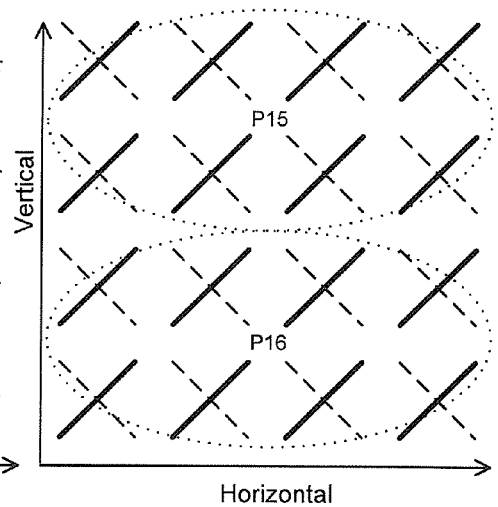

FIGS. 13A and 13B illustrate two variations of antenna virtualization for CSI process 2 (2 ports). Another variation of antenna virtualization is shown in FIG. 13A. The first and third rows are grouped together to form one port P15 by applying a virtualization vector, and the second and the fourth rows are grouped together to form another port P16 with the same virtualization vector. The effective antenna spacing of the two virtualized antennas is $d_z$, the same as that in FIG. 12A. The rest of UE and eNB operations are the same as in FIG. 12A.

FIG. 13B shows another variation of antenna virtualization. The first and second rows are grouped together to form one port P15 by applying a virtualization vector, and the third and the fourth rows are grouped together to form another port P16 with the same virtualization vector. The effective antenna spacing of the two virtualized antennas is 24, twice as much as that in FIG. 12B. The rest of UE and eNB operations are the same as in FIG. 12B.

Embodiment 1-3

Vertically Transmitted CSI Process 1

Figure 14A:
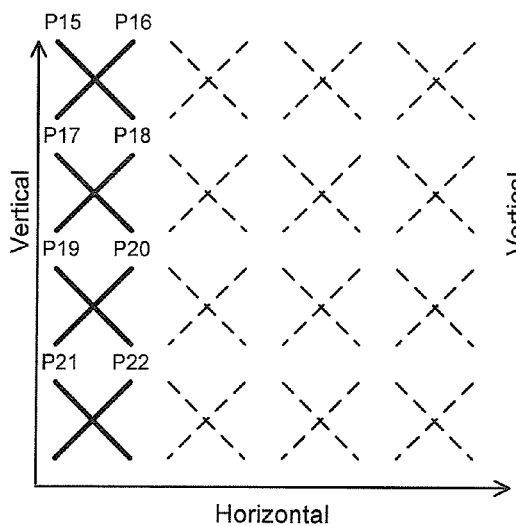
FIGS. 14A and 14B illustrate a further channel state information reference signal antenna virtualization and mapping (subsampling) pattern on antenna ports for a two-dimensional antenna array according to some embodiments of the present disclosure.
Figure 14B:
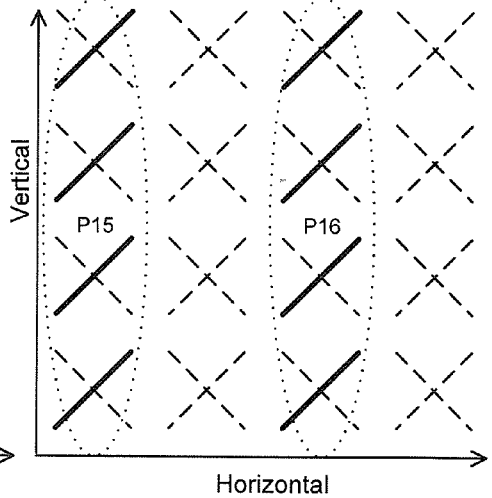

FIGS. 14A and 14B illustrate CSI-RS virtualization and mapping on antenna ports comprising the 2D array according to some embodiments of the present disclosure. FIGS. 14A and 14B depict an antenna virtualization and mapping (subsampling) pattern for 8 CSI-RS plus 2 CSI-RS.

In FIG. 14A, 8 CSI-RS for CSI process 1 are one-to-one mapped to 8 antenna elements of the first column of x-pol antennas of the 2D array. In FIG. 14B, on the other hand, 2 CSI-RS for CSI process 2 are mapped on 8 antennas with a same polarization comprising the first and the third columns of the 2D array. Furthermore, to construct 2 CSI-RS antenna ports for CSI process 2, four antennas in each row are grouped together, wherein a virtualization precoder is applied on the four antennas comprising a CSI-RS antenna port.

The 8 ports CSI process allows the eNB to measure a co-phasing factor between two polarizations as well as one or more preferred beam direction(s) in one dimension, which is horizontal or azimuth dimension in the Embodiment 1-1. In this embodiment, a different way of CSI-RS transmission is presented, where the CSI process 1 is used to measure the preferred beam direction in vertical domain, as shown in FIGS. 11A and 11B. In this case, CSI process 2 is used to measure the preferred beam direction in horizontal domain.

Rank 1 Case:

In some embodiments, both H-RI=V-RI=1. In this case, according to CSI process 1, eNB receives two PMI indices $i_1$ and $i_2$ from the UE according to TABLE 3. Based on the UE feedback, eNB obtains $W_{m,n}^{(1)}$, which corresponds to a preferred beam direction $v_m$ in horizontal (azimuth) domain, and co-phasing factor $\phi_n$ between the two different polarizations:

$\phi_n = e^{j\pi n/2}$, and $v_m = [1\ e^{j2\pi m/32}\ e^{j4\pi m/32}\ e^{j6\pi m/32}]^T$.

In this case, the horizontal phase progression is $\Delta\phi=2\pi m/32$. Furthermore, according to CSI process 2, eNB receives a PMI index mapping a precoding vector according to TABLE 1, which equivalently indicates that the phase progression (preferred beam direction) in vertical (elevation) domain is $2\Delta\theta=\{0, \pi/2, \pi, 3\pi/2\}$, or $\Delta\theta=\{0, \pi/4, \pi/2, 3\pi/4\}$. Equivalently, define: $U_k^{(1)}=[1\ u_k^1\ u_k^2\ u_k^3]^T$, where $u_k=e^{-i(k-1)\pi/4}$, $k=\{0, 1, 2, 4\}$. Then, the eNB constructs a preferred precoder for the UE on the all Tx antennas, a length 32 vector, as:

$$W_{m,n,k}^{(1)} = \frac{1}{\sqrt{32}} v_m \otimes \begin{bmatrix} U_k^{(1)} \\ \varphi_n U_k^{(1)} \end{bmatrix} = \frac{1}{\sqrt{32}} \begin{bmatrix} U_k^{(1)} \\ \varphi_n U_k^{(1)} \\ e^{j2\pi m/32} U_k^{(1)} \\ e^{j2\pi m/32} \varphi_n U_k^{(1)} \\ e^{j4\pi m/32} U_k^{(1)} \\ e^{j4\pi m/32} \varphi_n U_k^{(1)} \\ e^{j6\pi m/32} U_k^{(1)} \\ e^{j6\pi m/32} \varphi_n U_k^{(1)} \end{bmatrix}.$$

The principles of these embodiments described above can be generalized to other configurations of two CSI processes. A few more exemplary embodiments are developed below.

Embodiment 2

CSI Process 1 with 8 CSI-RS and CSI Process 2 with 4 CSI-RS

In one embodiment, eNB configures UE with 2 CSI process, one 8 antenna ports and the other 4 antenna ports.

Figure 15A:
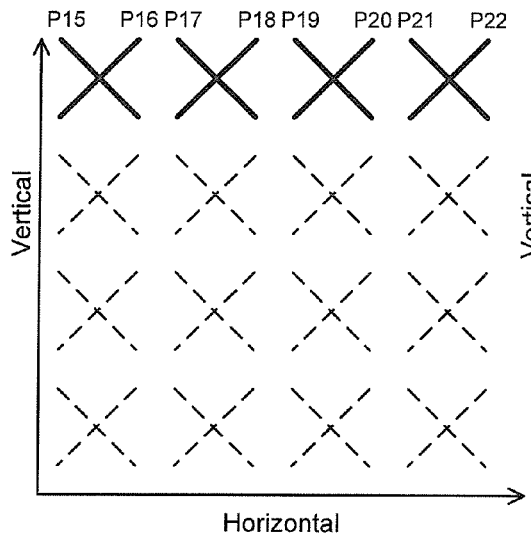
FIGS. 15A and 15B illustrate another channel state information reference signal antenna virtualization and mapping (subsampling) pattern on antenna ports for a two-dimensional antenna array according to some embodiments of the present disclosure.
Figure 15B:
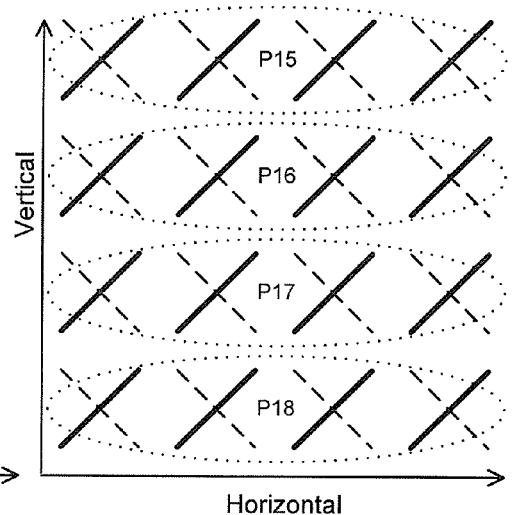

FIGS. 15A and 15B illustrate CSI-RS virtualization and mapping on antenna ports comprising the 2D array according to some embodiments of the present disclosure. FIGS. 15A and 15B depict an antenna virtualization and mapping (subsampling) pattern for 8 CSI-RS plus 4. The 8 CSI-RS for CSI process 1 are mapped on 8 antennas comprising the first row of the 2D array. On the other hand, 4 CSI-RS for CSI process 2 are mapped on 16 antennas with a same polarization comprising the 2D array. Furthermore, to construct 4 CSI-RS antenna ports for CSI process 2, 4 antennas in each row are grouped together, wherein a virtualization precoder is applied on the four antennas comprising a CSI-RS antenna port.

Upon receiving UE's feedback report for 2 CSI processes, the eNB reconstruct the channel in a manner similar to Embodiment 1-1, except that the elevation/vertical phase progression $\Delta\phi$ is derived from 4 Tx PMI where the antenna spacing is $d_z$.

Figure 16A:
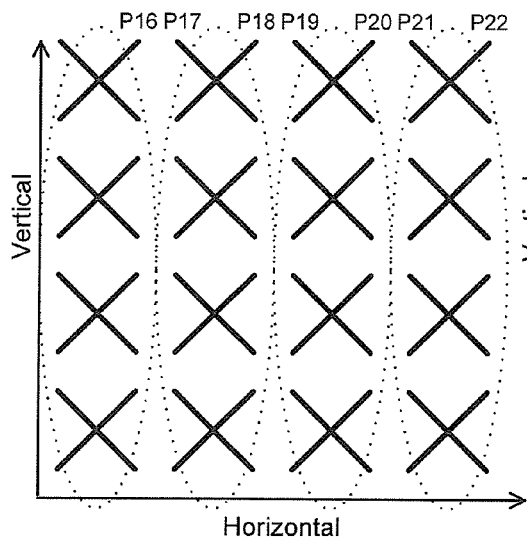
FIGS. 16A and 16B depict a variation of antenna virtualization for a two-dimensional antenna array according to one embodiment of the present disclosure.
Figure 16B:
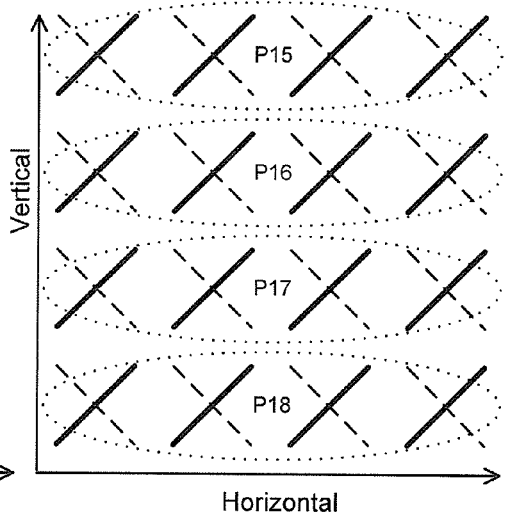

Variations on different antenna virtualization patterns for the two CSI processes can be applied using the same principle as Embodiment 1-2. One example is shown in FIGS. 16A and 16B. FIGS. 16A and 16B depict a variation of antenna virtualization for Embodiment 2. CSI process 1 is the same as Embodiment 1-2. In CSI process 2, antennas in one row with the same polarization are grouped with a virtualization vector.

Figure 17A:
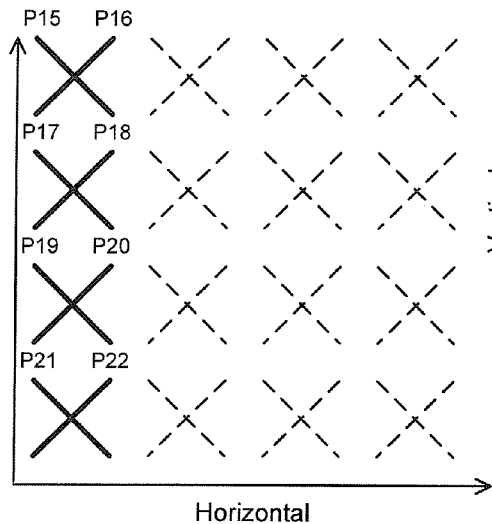
FIGS. 17A and 17B illustrate yet another channel state information reference signal antenna virtualization and mapping (subsampling) pattern on antenna ports for a two-dimensional antenna array according to some embodiments of the present disclosure.
Figure 17B:
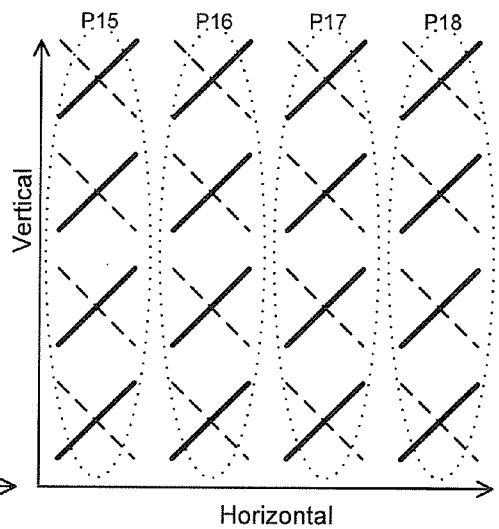

Also, CSI process 1 can be 4 ports and CSI process 2 can be 8 ports, similar to Embodiment 1-3. One example is shown as FIGS. 17A and 17B. FIG. 17B depicts a vertically transmitted CSI process with 4 ports. CSI process 1 is the same as Embodiment 1-3. In CSI process 2, antennas in one column with the same polarization are grouped with a virtualization vector.

Embodiment 3

Both CSI Processes 1 with 8 CSI-RS

Figure 18A:
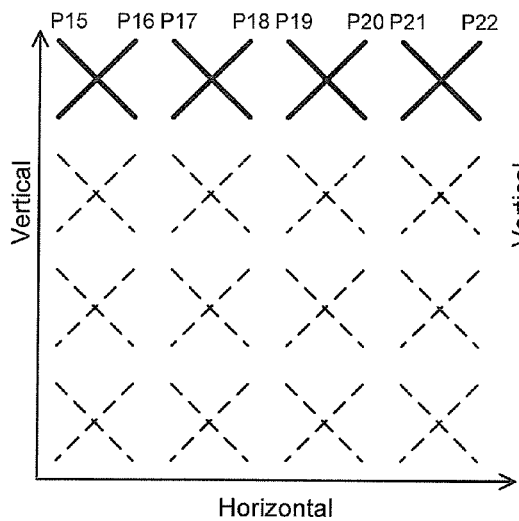
FIGS. 18A and 18B illustrate channel state information reference signal mapping on antenna ports comprising the two-dimensional array according to some embodiments of the present disclosure.
Figure 18B:
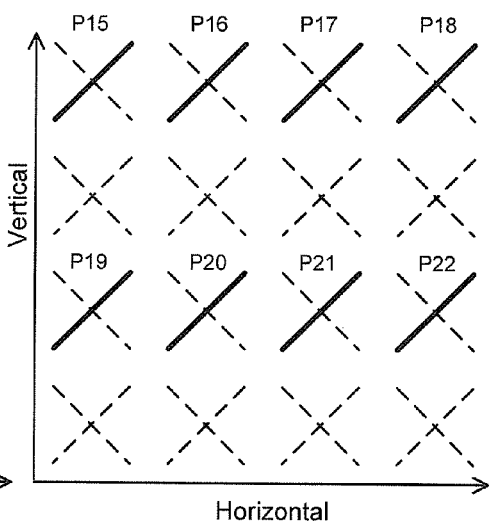

In one embodiment, the eNB configures the UE with 2 CSI process with 8 antenna ports. FIGS. 18A and 18B illustrate CSI-RS mapping on antenna ports comprising the 2D array according to some embodiments of the present disclosure. FIGS. 18A and 18B depict an antenna virtualization and mapping (subsampling) pattern for two 8 CSI-RS. CSI process 1 is the same as Embodiment 1-1, which allows the eNB to estimate the horizontal phase progression.

In CSI process 2, 8 CSI-RS ports are transmitted in the 4 antennas in the first row and 4 antennas in the third row, all with the same polarization. The co-phasing factor $\phi_n$ provided in CSI process 2 allows the eNB to estimate the vertical phase progression $\Delta\theta=\phi_n/2??=?\_n/2$, as the vertical antenna spacing is $2d_z$.

Embodiment 4

Adaptive CSI Process Configuration

Keeping in mind a plurality of specific embodiments that are described above and other variations of the same themes, each of the antenna subsampling pattern may be suited for a particular/distinct set of deployment scenarios (e.g. antenna spacing, angular spreads, eNB height, cell or sector radius). Therefore, it is beneficial for the eNB to be able to configure a subsampling pattern out of a set of antenna subsampling patterns (for instance, a set formed by the patterns given in some embodiments in the current invention), either in a UE-specific manner, a cell-specific manner, or any combination between UE- and cell-specific. This can be implemented as follows:

In one embodiment (4-1), the eNB is enabled to change/adapt the antenna subsampling pattern and allocate the necessary CSI-RS resource(s) without informing the UE(s) of interest. In this case, channel information interpolation is performed at the eNB based on the CSI reports from the UE(s) of interest. The UE(s) of interest simply receive and process the assigned CSI-RS resource(s) to derive CSI feedbacks for each instance of resource allocations (one TTI/subframe in LTE nomenclature).

In another embodiment (4-2), the eNB is enabled to change/adapt the antenna subsampling pattern and allocate the necessary CSI-RS resource(s) while informing the UE(s) of interest. This alternative not only enables channel information interpolation at the eNB based on the CSI reports from the UE(s) of interest, but also (if desired) interpolation of spatial channel estimates. The second capability allows the UE to report CSI feedback associated with all the active antenna elements (that is, not limited to the assigned antenna subset within a given TTI/subframe). In this case, the eNB may also configure the UE to report CSI feedback associated with either a subset or all of the active antenna elements. The eNB may signal the antenna subsampling pattern to the UE(s) of interest in one of the following methods:

(Alt 1): A higher-layer signaling (e.g. via RRC signaling) is used to update the choice of antenna subsampling pattern per UE.

(Alt 2): D-BCH signaling in LTE is able to accommodate such (the choice of antenna subsampling pattern slowly updated). So the choice of antenna subsampling pattern are signaled via PDSCH where the UE of interest is notified via some paging mechanism (e.g. PDCCH-based) to look for the update.

(Alt 3): When aperiodic PUSCH-based (shared data channel) CSI reporting (e.g. in TS36.213 section 7.2.1) is configured for the UE, the choice of antenna subsampling pattern can be included in the UL grant that triggers the CSI report.

Any combination of 4-1 and 4-2 is possible. For instance, some UEs may be configured according to embodiment 4-1 while others according to embodiment 4-2.

To support operation of a large array in wireless communication, efficient CSI-RS transmission and feedback methods are required. In many practical operations, channels have correlation induced by the propagation environment and can be "compressed." This disclosure proposes:

- An eNB signals UEs one or more pre-defined array pattern on which the CSI-RS is transmitted. The array pattern can be subsampled to reduce the amount of CSI-RS transmission.
- A UE's reconstruction of the channel based on received CSI-RS and its associated array pattern, and the corresponding derivation of CQI, RI and PMI. The UE's channel reconstruction may include 2D spatial filtering, linear interpolation and exploration, or simple DFT subsampling.
- An eNB's reconstruction of the channel based on the UE's feedback report, possibly combining uplink channel measurement The result is a scalable and FDD-enabling CSI feedback scheme for FD-MIMO, where the downlink channel is quantized according to a finite set of basis functions/vectors to reduce the number of coefficients that need to be quantized and reported from a UE to the eNB.

Figure 19:
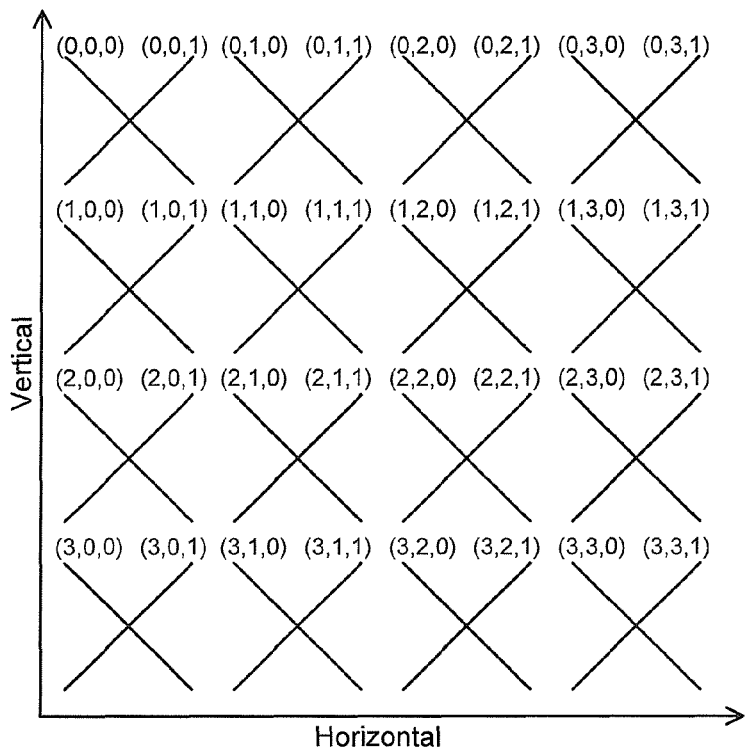
FIG. 19 illustrates antenna element (or TXRU) numbering according to embodiments of the present disclosure.

In some embodiments, the eNB is equipped with 2D rectangular antenna array (or TXRUs), comprising M rows and N columns with P=2 polarized, wherein each element (or TXRU) is indexed with (m,n,p), and m=0, ..., M−1, n=0, ..., N−1, p=0, ..., P−1, as illustrated in FIG. 19 with M=N=4. When a TXRU array according to FIG. 19 is used, a TXRU can be associated with multiple antenna elements. In one example (one-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 19.

In conventional LTE, MIMO precoding (for spatial multiplexing) can be performed either with CRS (cf. TS36.211 section 6.3.4.2) or UE-RS (cf. TS36.211 section 6.3.4.4). In either case, each UE operating in spatial multiplexing mode(s) is configured to report CSI which may contain PMI (i.e., precoding codebook index). The PMI report is derived from one of the following sets of standardized codebooks:

Two antenna ports: {TS36.211 table 6.3.4.2.3-1}
Four antenna ports: {TS36.211 table 6.3.4.2.3-2} or {TS36.213 table 7.2.4-0A, B, C, and D}
Eight antenna ports: {TS36.213 table 7.2.4-1, 2, 3, 4, 5, 6, 7, and 8}

If the eNB follows the UE's PMI recommendation, the eNB is expected to precode transmitted signals according to the recommended precoding vector/matrix (for a given subframe and PRB). Regardless of whether the eNB follows the UE's recommendation, the UE is configured to report a PMI according to the above precoding codebooks. Here a PMI (which may consist of a single index or a pair of indices) is associated with a precoding matrix W of size $N_C \times N_L$, where $N_C$ is the number of antenna ports in one row (=number of columns) and $N_L$ is the number of transmission layers.

For FD-MIMO utilizing a 2D antenna array (and hence 2D precoding), high-performance, scalable (with respect to the number and geometry of transmit antennas), and flexible CSI feedback framework and structure is necessary. To achieve high performance, more accurate CSI (preferably in terms of quantized MIMO channel) is needed at the eNB. This is especially the case for FDD scenarios where short-term reciprocity is infeasible. In this case, the previous LTE (e.g. Rel. 12) precoding framework (PMI-based feedback) may need to be replaced. Yet feeding back the quantized channel coefficients may be excessive in terms of feedback requirements.

In this disclosure, at least one of the following properties of FD-MIMO is included in the proposed scheme:

New type of CSI-RS resource (hybrid) comprising non-zero power CSI-RS ports and zero power CSI-RS ports
CSI-RS subsampling pattern signaling and CSI process configuration
CSI report(s) and demodulation according to subsampling pattern Some examples include:

Example 1

The eNB configures a hybrid CSI-RS resource with N CSI-RS ports and subsampling parameter(s) to a UE
The UE derives $N_1$ non-zero power CSI-RS ports and 2 zero power CSI-RS ports out of the N CSI-RS ports ($N=N_1+N_2$) with the subsampling parameters
The eNB transmits CSI-RS on the $N_1$ non-zero power CSI-RS ports
The UE derives CQI/PMI/RI on the N CSI-RS ports while receiving only $N_1$ port non-zero power CSI-RSs.

Example 2

An eNB signals a UE a number of pre-defined CSI-RS subsampling patterns, wherein
A CSI-RS subsampling pattern indicates a subset of configured CSI-RS antenna ports, and CSI-RS are transmitted only on the subset.
The UE estimates channels on the configured CSI-RS antenna ports, based on the received subset of CSI-RS; and derives CSI, and/or CQI/PMI/RI. This reconstruction of channel measurement may involve 2D spatial filtering, linear interpolation and extrapolation, and/or DFT subsampling or oversampling. All these embodiments pertain to additional signal processing to achieve higher resolution for a sparser channel measurement.
The UE feeds back the CQI/PMI/RI and/or the CSI to the eNB.
The eNB reconstructs CSI (with channel reconstruction being a special case) for precoding, scheduling and adaptive modulation & coding (AMC), and link adaptation associated with the UE based on the feedback.
It is also possible to complement such reconstruction with uplink channel measurement based on an uplink signal such as the sounding reference signal (SRS). This reconstruction may involve 2D spatial filtering, linear interpolation and extrapolation, or a DFT subsampling.

Figure 20:
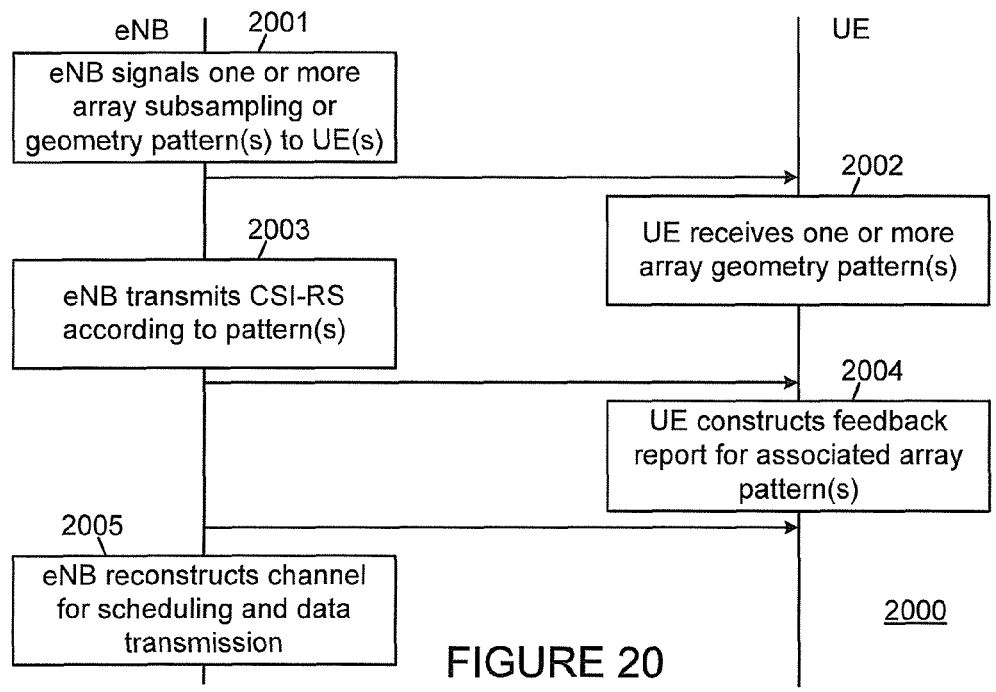
FIG. 20 is a flow diagram illustrating an exemplary process according to one embodiment of the present disclosure.

The overall procedure is illustrated in FIG. 20, wherein the pattern is termed the "array geometry pattern," or "antenna subsampling/downsampling pattern," or "CSI-RS subsampling/downsampling pattern"; those terms are used interchangeably herein. The procedure 2000 begins with an eNB signaling one or more array subsampling or geometry pattern(s) to UE(s) served by the eNB (step 2001). Each UE receives the one or more array geometry pattern(s) (step 2002). The eNB then eNB transmits CSI-RS according to patterns) (step 2003). The UE constructs a feedback report for associated array pattern(s) based on the received CSI-RSs (step 2004). Based on the feedback report, the eNB reconstructs the channel between the eNB and the UE for scheduling and data transmission (step 2005).

In some embodiments, CSI-RS subsampling is also interpreted as transmitting zero-power CSI-RS on the TXRUs that are subsampled or punctured or muted. The REs for non-power CSI-RS can be used to transmit data or for measuring purpose.

In some embodiments, a hybrid CSI-RS port (or partial CSI-RS port, or subsampled CSI-RS port) consists of zero or more non-zero power CSI-RS ports and zero or more zero-power CSI-RS ports (or muted CSI-RS ports). A CSI-RS port configured with a subsampling pattern(s) is considered as a hybrid CSI-RS port.

Two examples of RE mapping of hybrid CSI-RS ports are illustrated in FIGS. 21A and 21B. In FIG. 21A ("Alt 1"), the solid-filled boxes without shading or hatching correspond to a non-zero power CSI-RS port while the boxes with diagonal hatching correspond to a zero power CSI-RS port. Sixteen CSI-RS ports are shown, where each box represents a CSI-RS RE and the number on each box is an index of a CSI-RS port. In FIG. 21B ("Alt 2"), the solid-filled boxes without shading or hatching again correspond to a non-zero power CSI-RS port. No zero power CSI-RS ports are depicted. Eight CSI-RS ports are shown, where each box represents a CSI-RS RE and the numbers are indices of non-zero power hybrid CSI-RS ports.

Alt 1: CSI-RS Port Muting/Puncturing

In this method, an N CSI-RS port RE mapping is used. N ports of hybrid CSI-RS are assumed to be mapped onto the REs indicated by the 16 port RE mapping, where the N ports comprise $N_1$ non-zero power CSI-RS ports and $N_2$ zero power CSI-RS ports. In the example of FIG. 21A, a 16 CSI-RS port RE mapping is used. The 16 hybrid CSI-RS ports are assumed to be mapped onto the REs indicated by the 16 port RE mapping.

A UE assumes that PDSCH is transmitted on REs of zero-power CSI-RS ports, but no PDSCH is transmitted on REs of non-zero CSI-RS ports. In other words, the UE performs rate matching around only the REs with non-zero power CSI-RS. More specifically, the UE performs rate matching according to assumptions as follows:

If the DCI associated with the PDSCH uses the C-RNTI or semi-persistent C-RNTI and if antenna subsampling is not configured, the PDSCH is not mapped to resource elements assumed by the UE to be used for transmission of:
  zero-power CSI reference signals, where the positions of the CSI reference signals are given by clause 6.10.5.2. The configuration for zero power CSI reference signals is
    obtained as described in clause 6.10.5.2, unless other values for these parameters are provided by clause 7.1.9 in 3GPP TS 36.213 [REF4], in which case these values are used in the resource blocks indicated by the relevant DCI, and
    obtained by higher-layer configuration of up to five reserved CSI-RS resources as part of the discovery signal configuration following the procedure for zero-power CSI-RS in clause 6.10.5.2.
  non-zero-power CSI reference signals for CSI reporting, where the positions of the non-zero-power CSI reference signals for CSI reporting are given by clause 6.10.5.2. The configuration for non-zero power CSI reference signals is obtained as described in clause 6.10.5.2.

If the DCI associated with the PDSCH uses the C-RNTI or semi-persistent C-RNTI and if antenna subsampling is configured,
  the PDSCH is not mapped to resource elements assumed by the UE to be used for transmission of non-zero power CSI-RS ports, and
  the PDSCH is mapped to resource elements assumed by the UE to be used for transmission of zero power CSI-RS ports.

Alt 2: Non-Zero Power CSI-RS Port Mapping

In this method, an $N_1$ CSI-RS port RE mapping is used. N ports of hybrid CSI-RS are assumed to be mapped onto the REs indicated by the 16 port RE mapping, where the N ports comprise $N_1$ non-zero power CSI-RS ports and $N_2$ zero power CSI-RS ports. The $N_1$ non-zero power CSI-RS ports are mapped onto the REs in the $N_1$ CSI-RS port RE mapping. In the example of FIG. 21B, an 8 CSI-RS port RE mapping is used. Only the 8 non-zero power CSI-RS ports are mapped onto the REs in the 8 CSI-RS port RE mapping.

In one embodiment, the eNB and UE operation of the current invention is as follows:
1. An eNB configures hybrid CSI-RS resource with N CSI-RS ports and subsampling parameter(s) to a UE.
2. The UE derives $N_1$ non-zero power CSI-RS ports and $N_2$ zero power CSI-RS ports out of the N CSI-RS ports ($N=N_1+N_2$) with the subsampling parameters.
3. The eNB transmits CSI-RS on the $N_1$ non-zero power CSI-RS ports.
4. The UE derives CQI/PMI/RI on the N CSI-RS ports while receiving only N1 port non-zero power CSI-RS.

Figure 24:
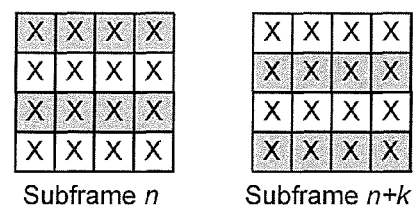
FIG. 24 illustrates examples of multiple subsampling patterns per CSI process according to embodiments of the present disclosure.

In some embodiments, the eNB and UE operation of the current invention is as follows:
1. An eNB configures and signals one or more CSI-RS subsampling pattern(s) to a UE.
   a. In some examples, it is assumed that a UE is configured with 32 CSI-RS ports, which are one-to-one mapped to corresponding 32 TXRUs (as shown in FIG. 19).
      i. For four columns of x-pol antennas, each column of a polarization dimension is associated with 4 TXRUs.
   b. In some examples, it is assumed that a UE is configured with 16 CSI-RS ports, which are one-to-one mapped to corresponding 16 TXRUs (or TXRUs), and these TXRUs are associated with a 2D rectangular antenna array comprising either:
      i. Two columns of x-pol antennas, and each column of a polarization dimension is associated with 4 TXRUs; or
      ii. Four columns of co-pot antennas, and each column is associated with 4 TXRUs.
   c. Some examples of CSI-RS subsampling patterns are shown in FIG. 22 for 32 TXRUs. Gray shaded boxes correspond to antennas with CSI-RS, for which PMI is obtained by feedback, while unshaded boxes correspond to antennas without CSI-RS, for which PMI is obtained by eNB interpolation.
      i. Patterns 1 through 4 in FIG. 22 have a downsampling ratio of 2, and patterns 5 through 8 have a downsampling ratio of 4.
      ii. The eNB transmits CSI-RSs on TXRUs highlighted with green.
   d. Some embodiments of eNB's signaling to UE of the aforementioned pattern are as follows:
      i. The eNB can semi-statically or dynamically configure one pattern out of the one or more subsampling patterns.
         1. The eNB can configure one subsampling pattern per CSI process, as shown in FIGS. 23A and 23B. The subsampling pattern can be the same or different for different CSI processes. In case 1 of FIG. 23A, 16 CSI-RS ports are configured, where both CSI process 1 and 2 are configured with identical patterns with no subsampling in horizontal and a subsampling factor (ratio) of 2 in the vertical (i.e., every other row). In case 2 of FIG. 23B, 16 CSI-RS ports are configured, where CSI process 1 and 2 are configured with different subsampling patterns.
         2. The eNB can configure more than one pattern per CSI process, where the patterns can be the same or different. In the example of FIG. 24, CSI process 1 is configured with two alternating patterns (or otherwise spaced by k subframes as shown), where the first pattern transmits non-zero power CSI-RS on the first and third rows and the second pattern transmits non-zero power CSI-RS on the second and the fourth row.
         3. The eNB can configure one or more patterns for all CSI processes.
      ii. The subsampling pattern may be indicated by one or more parameters.
         1. In one method, a subsampling pattern is indicated by a horizontal subsampling factor $S_H$ and a vertical subsampling factor $S_V$. Suppose that a UE is configured with a CSI-RS resource comprising full-power CSI-RS for a 2D antenna array with M rows, N columns and P polarizations as illustrated in FIG. 19. If the UE is configured with the horizontal subsampling factor $S_H$ and the vertical subsampling factor $S_V$, the UE receives non-zero power CSI-RS for antenna ports corresponding to ($i_V S_V$, $i_H S_H$, p), where $i_V$=0, 1, . . . , $\lfloor M/S_V \rfloor$, $i_H$=0, 1, . . . , $\lfloor N/S_H \rfloor$, p=0, 1. The UE receives zero power CSI-RS for all the other antenna ports. The UE derives CSI (PMI/CQI/RI) on the full ports relying on the channel estimates on the subsampled CSI-RS ports. Candidate values for each of the subsampling factors include 1, 2 and 4.

In addition to the two subsampling factors $S_H$ and $S_V$, a horizontal offset $O_H$ and a vertical offset $O_V$ are also configured to the UE. If the UE is also configured with the horizontal offset $O_H \in \{0, 1, \ldots, S_H-1\}$ and the vertical offset $O_V \in \{0, 1, \ldots, S_V-1\}$, then the UE receives non-zero power CSI-RS for antenna ports corresponding to ($O_H+i_V S_V$, $O_V+i_H S_H$, p), where $i_V$=0, 1, . . . , $\lfloor M/S_V \rfloor$, $i_H$=0, 1, . . . , $\lfloor N/S_H \rfloor$, p=0, 1. The UE receives zero power CSI-RS for all the other antenna ports. The UE derives CSI (PMI/CQI/RI) on the full ports relying on the channel estimates on the subsampled CSI-RS ports.

2. In another method, a set of column or row indices that corresponds to non-zero power CSI-RS ports is configured to the UE. Suppose that a UE is configured with a CSI-RS resource comprising full-power CSI-RS for a 2D antenna array with M rows, N columns and P polarizations as illustrated in FIG. 19. Let R={$r_0$, $r_1$, . . . , $r_{M-1}$} be the row bitmap and C={$c_0$, $c_1$, . . . , $c_{N-1}$} be the column bitmap. If $r_i$=1, then the TXRUs in the i-th row will have non-zero power CSI-RS. If $c_j$=1, then the TXRUs in the j-th column have non-zero power CSI-RS, for p=0, 1.

R and C can be both configured, or either one of them configured. In one example, if only R is configured, then all columns of TXRUs have non-zero power CSI-RS. If only C is configured, then all rows of TXRUs have non-zero power CSI-RS.

3. In one method, Q subsampling patterns are associated with a configuration of a 2D antenna array with M rows, N columns and P polarizations. The eNB configures one or more patterns out of Q patterns to the UE.

Figure 25:
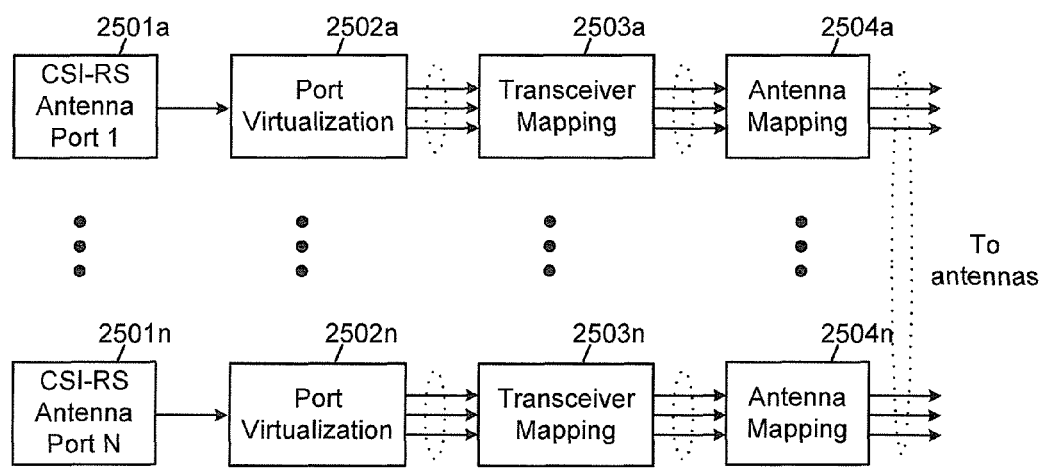
FIG. 25 is a block diagram of CSI-RS virtualization according to one embodiment of the present disclosure.

4. In another method, a subsampling pattern is indicated by an antenna port bitmap, wherein i-th bit indicates whether the i-th antenna port carries non-zero power CSI-RS or zero-power CSI-RS:

| | |
|---|---|
| i-th bit of the bitmap is 0 | zero power CSI-RS on the i-th CSI-RS port |
| i-th bit of the bitmap is 1 | non-zero power CSI-RS on the i-th CSI-RS port | iii. Antenna virtualization can be applied with a general procedure as shown in FIG. 25, described in further detail below.

Figures 26A, 26B:
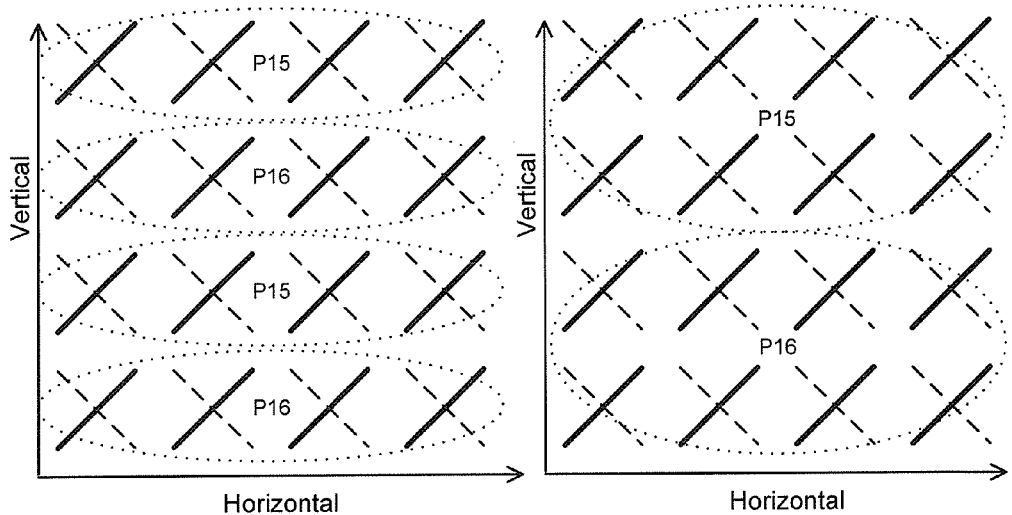
FIGS. 26A and 26B illustrate examples of antenna virtualization according to one embodiment of the present disclosure.

Two examples of antenna virtualization are shown in FIGS. 26A and 26B. In these two examples, each transceiver is connected to one group (indicated by thin dotted line) of antennas (conceptually represented by a heavy solid line or thin dashed line). More general transceiver to antenna mapping can be performed as illustrated by FIG. 25.

2. A UE receives one or more CSI-RS transmission patterns from the above-described methods, e.g., via either decoding a message from PDCCH/ePDCCH or higher layer signaling such as RRC configuration. It can also be inferred from some other configurations such as transmission mode (TM).

3. The eNB transmits CSI-RS according to the configured patterns. If a subsampling pattern is configured, the eNB only transmits non-zero power CSI-RS ports on the corresponding TXRUs. The eNB may or may not transmit on zero power CSI-RS ports on the corresponding TXRUs.

4. The UE calculates CSI reports for the configured CSI processes.
   a. The UE shall only assume non-zero power CSI-RS on the non-zero power CSI-RS ports configured by the subsampling pattern when deriving CSI report.
   b. In one method, the UE first reconstructs the full CSI-RS ports based on the non-zero power CSI-RS ports, and then derives CSI report. The channel reconstruction may be based on, but not limited to: (1) 2D filtering, (2) linear interpolation and extrapolation, (3) horizontal and vertical PMI, (4) DFT subsampling, or (5) a combination of (1) to (4).

5. The eNB reconstructs the channel based on CSI reporting from the UE
   a. The eNB may receive PMI reports corresponding to the entire DFT vector $b_{k,l}$ from one CSI process and use it directly for scheduling and precoding.
   b. The eNB may receive PMI reports corresponding to the entire DFT vector $b_{k,l}$ from multiple CSI processes and combine the PMI reports received by interpolation, extrapolation, or filter to reconstruct the channel.
   c. The eNB may also use the uplink measurements such as direction of arrival (DoA) estimation as well as PMI in (a) and (b) to reconstruct the channel.

Figure 27:
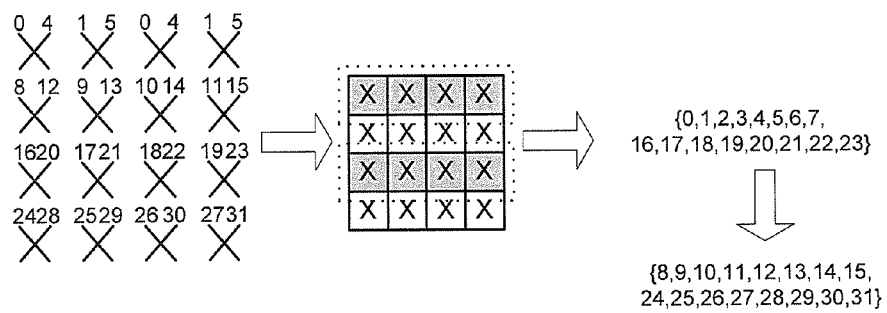
FIG. 27 illustrates a UE process of determining TXRU (or antenna port) indices with non-zero power CSI-RS and zero power CSI-RS according to one embodiment of the present disclosure.

FIG. 27 illustrates a UE process of determining TXRU (or antenna port) indices with non-zero power CSI-RS and zero power CSI-RS according to one embodiment of the present disclosure. The UE first derives eNB TXRU indices with the corresponding row, column and polarization information (left-most step). The UE then derives the subsampling configuration and determines which rows or columns have non-zero power CSI-RSs (second step). The UE finds the TSRU indices for non-zero power CSI-RS (top, right-most step), and then takes the complement of the non-zero power CSI-RS indices to derive the zero power CSI-RS indices (bottom, right-most step).

In some embodiments, the UE derives the TXRU indices that have non-zero power CSI-RS as follows:
1. As illustrated in FIG. 27, a UE is configured with 32 CSI-RS antenna ports, comprising 4 rows, wherein rows 1, 2, 3, 4, correspond to antenna ports {1, 2, . . . , 7}, {8, 9, . . . , 15}, {16, 17, . . . , 23} and {24, 25, . . . , 31}, respectively.

2. When the UE is configured with vertical subsampling factor of 2, UE infers that the first row and the third row have non-zero power CSI-RS, which corresponds to the antenna port indices {0, 1, 2, 3, 4, 5, 6, 7, 16, 17, 18, 29, 20, 21, 22, 23}.
3. The UE then knows, e.g., by taking a complement, which antenna ports have zero power CSI-RS. In the example of FIG. 27, the indices for zero power CSI-RS are {8, 9, 10, 11, 12, 13, 14, 15, 24, 25, 26, 27, 28, 29, 30, 31}.

Figure 28:
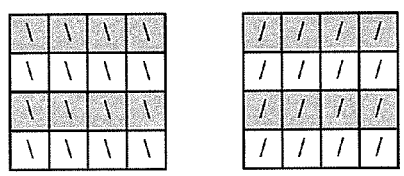
FIG. 28 illustrates an example of separate linear interpolation on two polarizations according to one embodiment of the present disclosure.

In some embodiments, the UE calculates CSI report according to some methods in the following:
1. The UE derives non-zero power CSI-RS antenna port indices. In the example of FIG. 28, the channels of the non-zero power CSI-RS ports are denoted as $h_k$, where k belongs to the set $$A = \left\{(i_V S_V, n, p): \forall\, i_V \in \left\{0, 1, \ldots, \frac{M}{S_V} - 1\right\},\right.$$
$$\left. n \in \{0, 1, \ldots, N-1\}, p \in \{1, P-1\}\right\},$$

which is derived according to the labeling of FIG. 19. In FIG. 28, (M, N, P, $S_V$)=(4,4,2,2), which implies that the set A={(0,0,0), (0,1,0), (0,2,0), (0,3,0), (0,0,1), (0,1,1), (0,2,1), (0,3,1), (2,0,0), (2,1,0), (2,2,0), (2,3,0), (2,0,1), (2,1,1), (2,2,1), (2,3,1}. The UE then interpolates or extrapolates the channels for zero-power (or muted) CSI-RS $h_k$ where k belongs to the set B=C−A, where $C = \{(i_V, n, p): \forall i_V \in \{0,1,\ldots,M-1\},\ n \in \{0,1,\ldots,N-1\},\ p \in \{1, P-1\}\}$.

For FIG. 28, the set B corresponds to {(1,0,0), (1,1,0), (1,2,0), (1,3,0), (1,0,1), (1,1,1), (1,2, 1), (1,3,1), (3,0,0), (3,1,0), (3,2,0), (3,3,0), (3,0,1), (3,1,1), (3,2, 1), (3,3,1)}.

2. The UE reconstructs all channels for the full CSI-RS ports:
   a. In one method, linear interpolation and extrapolation are applied. A UE separately reconstructs channels for TXRUs without non-zero-power CSI-RS, as shown in FIG. 28. In one example, the measured non-zero power CSI-RS are denoted as $h_k$, where k is equal to {0, 1, 2, 3, 4, 5, 6, 7, 16, 17, 18, 29, 20, 21, 22, 23}, according to set A. The UE interpolates or extrapolates the channels for zero-power (or muted) CSI-RS $h_k$ where k is equal to {8, 9, 10, 11, 12, 13, 14, 15, 24, 25, 26, 27, 28, 29, 30, 31}, according to set B:

$$h_k = \frac{h_{k-8} + h_{k+8}}{2},$$
$k = \{(1, 0, 0), (1, 1, 0), (1, 2, 0),$
$\quad (1, 3, 0), (1, 0, 1), (1, 1, 1), (1, 2, 1), (1, 3, 1)\}$ $$h_k = \frac{3h_{k-8} - h_{k-24}}{2},$$
$k = \{(3, 0, 0), (3, 1, 0), (3, 2, 0),$
$\quad (3, 3, 0), (3, 0, 1), (3, 1, 1), (3, 2, 1), (3, 3, 1)\}$ b. In another method, 2D minimum mean square error (MMSE) estimation, filtering, and/or interpolation is used. Taking Pattern 1 in FIG. 22 to describe an example of 2D MMSE estimation/interpolation, in one embodiment, a UE applies a 2D MMSE to interpolate the channels without nonzero power CSI-RS. The UE first estimates a cross-correlation matrix $R_{yy}$ among the channels with nonzero CSI-RS, i.e., $$h_{csi} = \begin{bmatrix} h_0 \\ h_1 \\ \vdots \\ h_{23} \end{bmatrix},$$

where an element in the vector is $h_k$ and k is equal to {0, 1, 2, 3, 4, 5, 6, 7, 16, 17, 18, 29, 20, 21, 22, 23}, $R_{yy} = E(h_{csi} h_{csi}^H)$.

In the above, the expectation E can be an experimental covariance matrix, calculated across one or more subcarriers and one or more subframes. The UE also calculates a cross-correlation matrix $R_{xy}$ among the channels without nonzero CSI-RS and with nonzero CSI-RS, i.e., $$h_{nocsi} = \begin{bmatrix} h_8 \\ h_9 \\ \vdots \\ h_{31} \end{bmatrix},$$

where an element in the vector is $h_k$ and k is equal to {8, 9, 10, 11, 12, 13, 14, 15, 24, 25, 26, 27, 28, 29, 30, 31}, $R_{xy} = E(h_{nocsi} h_{csi}^H)$.

Then, the UE interpolates/reconstructs the channels for TXRUs without nonzero power CSI-RS:

$h_{nocsi} = R_{xy} R_{yy}^{-1} h_{csi}$.

In the above, the expectation E can be experimental covariance matrix, calculated across one or more subcarriers and one or more subframes. In an example of FIG. 24, 16 non-zero power CSI-RS ports are received in subframe n, whose channels are denoted as $h_{(1,k,i)}$, where k is equal to {0, 1, 2, 3, 4, 5, 6, 7, 16, 17, 18, 29, 20, 21, 22, 23}, for subcarrier i. In subframe n+k, 16 non-zero power CSI-RS ports are received, whose channels are denoted as $h_{(2,k,i)}$, where k is equal to {8, 9, 10, 11, 12, 13, 14, 15, 24, 25, 26, 27, 28, 29, 30, 31}, for subcarrier i. Then, for subcarrier i, $$h_{nocsi,i} = \begin{bmatrix} h_{2,8,i} \\ h_{2,9,i} \\ \vdots \\ h_{2,30,i} \\ h_{2,31,i} \end{bmatrix}$$

and $$h_{csi,i} = \begin{bmatrix} h_{1,0,i} \\ h_{1,1,i} \\ \vdots \\ h_{1,22,i} \\ h_{1,23,i} \end{bmatrix}$$

the cross correlation between antenna $$R_{xy} = \frac{\sum_i h_{nocsi,i} h_{csi,i}^H}{N}$$

where N is the total number of subcarriers used in the calculation.

c. In one method, the UE combines non-zero power CSI-RS ports received on multiple subframes. In the example of FIG. 24, the UE is configured with 32 CSI-RS ports. The UE receives 16 non-zero power CSI-RS ports in subframe n, whose channels are denoted as as $h_{(1,k)}$, where k is equal to {0, 1, 2, 3, 4, 5, 6, 7, 16, 17, 18, 29, 20, 21, 22, 23}, according to set A. The UE receives another 16 non-zero power CSI-RS ports in subframe n+k, whose channels are denoted as as $h_{(2,k)}$, where k is equal to {8, 9, 10, 11, 12, 13, 14, 15, 24, 25, 26, 27, 28, 29, 30, 31}, according to set A. Then, the UE can combine the two set of channel estimates and obtain full 32 channels:

$$h_{csi} = \begin{bmatrix} h_{1,0} \\ h_{1,1} \\ \vdots \\ h_{1,7} \\ h_{2,8} \\ h_{2,9} \\ \vdots \\ h_{2,31} \end{bmatrix}.$$

d. In another method: Horizontal and vertical PMI calculation.
Example 1:
Assume a single CSI process is transmitted on pattern 1 (as shown in FIG. 22) of a single-polarized antenna array.
The UE first selects horizontal PMI (H-PMI):
  Calculate two H-PMIs based on the CSI-RS corresponding to the first and the third rows, respectively; if two PMI is identical, then select as H-PMI. If not,
  If there a PMI in between, select it as PMI; if not, select the PMI with higher inner product
Then, the UE selects vertical PMI (V-PMI):
  Calculate four V-PMIs according to the four columns of CSI-RSs, and vote for V-PMI. If there is a tie:
  If there a PMI in between, select it as PMI; if not, select the PMI with higher inner product.
Example 2
Assume a single CSI-RS is transmitted on pattern 1 of a single-polarized antenna array.
The UE may jointly select a H-PMI and V-PMI by exhaustive search of all possible combination of H-PMI and V-PMI, i.e., finding the one with the highest correlation with the received CSI-RSs.
Example 3
Assume a single CSI is transmitted on pattern 2 of a single-polarized antenna array.
The UE first selects horizontal PMI (H-PMI):
  Calculate a H-PMI based on CSI-RS corresponding to a first row.
Then, the UE selects vertical PMI (V-PMI):
  Calculate three V-PMIs according to the CSI-RS transmitted at column 2, 3 and 4. Denote the DFT angle directions associated with the three PMI as $\beta_1$, $\beta_2$, $\beta_3$, respectively.
  Ideally (no estimation error and line-of-sight operation), $\beta_1 = \beta_2/2 = \beta_3/2$, as the vertical antenna spacing is different among these three columns.
  Derive the corresponding DFT angles with antenna spacing as in the second column for $\beta_2$, $\beta_3$, that is $\beta_1^{(2)} = \beta_2/2$, $\beta_1^{(3)} = \beta_3/2$. Vote for the PMIs. If there is a tie:
  If there a PMI in between, select it as PMI; if not, select the PMI with higher inner product.
e. In one method: DFT subsampling based PMI
Example 1:
According to the CSI-RS subsampling pattern, the UE selects the corresponding elements in a full 2D DFT codewords, and find the codewords yields the highest inner product with the received CSI-RS.
The 2D DFT codeword can be in the format of:

$$B_{k,l} = \frac{1}{\sqrt{N_r N_c}} \begin{bmatrix} 1 \\ \exp\left(j\frac{2\pi l}{\Delta_r N_r}\right) \\ \vdots \\ \exp\left(j(N_r-1)\frac{2\pi l}{\Delta_r N_r}\right) \end{bmatrix} \begin{bmatrix} 1 \\ \exp\left(j\frac{2\pi k}{\Delta_c N_c}\right) \\ \vdots \\ \exp\left(j(N_c-1)\frac{2\pi k}{\Delta_c N_c}\right) \end{bmatrix}$$

$\Delta_r$ and $\Delta_c$ are oversampling factors (integers $\geq 1$, with 1 as a special case of non-overlapping DFT beams) which produce overlapping DFT beams. In that case, $$B_{k,l} = \frac{1}{\sqrt{N_r N_c}} \begin{bmatrix} 1 \\ \exp\left(j\frac{2\pi l}{\Delta_r N_r}\right) \\ \vdots \\ \exp\left(j(N_r-1)\frac{2\pi l}{\Delta_r N_r}\right) \end{bmatrix} \begin{bmatrix} 1 \\ \exp\left(j\frac{2\pi k}{\Delta_c N_c}\right) \\ \vdots \\ \exp\left(j(N_c-1)\frac{2\pi k}{\Delta_c N_c}\right) \end{bmatrix}^T,$$

$l = 0, 1, \ldots, \Delta_r N_r - 1, k = 0, 1, \ldots \Delta_c N_c - 1.$

As mentioned above, oversampling factors of 1 correspond to non-overlapping beams, i.e., critically-sampled DFT vectors.
In one example, pattern 1 is configured for a single polarized array and the antenna ports are indexed as shown in FIG. 10. The measured CSI-RS are denoted as $h_{(k,l)}$, where k (represents horizontal index) is equal to {0, 1, 2, 3} and l (represents vertical index) is equal to {0,2}, and denote:

$$h = \begin{bmatrix} h_{0,0} \\ h_{1,0} \\ \vdots \\ h_{7,2} \end{bmatrix}.$$

Then, the UE may correlate h with PMIs (DFT) vectors with the corresponding element $$b_{k,l}=\text{vec}(B_{k,l}),$$

where k is equal to {0, 1, 2, 3} and l is equal to {0,2}, and select a preferred PMI as the one yields the highest correlation or inner product.

Example 2:

The UE may apply a 2D spatial filter before proceeding to the method described in Example 1.

The 2D filter can be either a low pass filter or a band pass filter. It can reduce the finite window effect due to limited number of spatial measurement. It is also possible to integrate DoA information in the filter.

Figure 29:
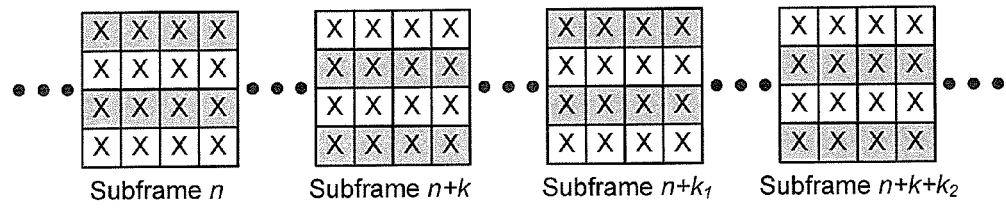
FIG. 29 illustrates an example of alternating CSI-RS subsampling patterns according to one embodiment of the present disclosure.

In one embodiment, multiple CSI-RS subsampling patterns are configured for a CSI process. The patterns alternate across subframes, where each pattern has a same or different periodicity. In FIG. 29, two CSI-RS subsampling patterns are configured for a CSI process. The first pattern is transmitted on subframe n with periodicity $k_1$, and the second pattern is transmitted on subframe n+k with periodicity $k_2$. The UE is configured to combine non-zero power CSI-RS ports received on multiple subframes.

In some embodiments, the UE derives CQI as follows:

Alt 1: CQI Derived Based on Channel Reconstruction for Zero Power CSI-RS Port

If a CSI process is configured with PMI/RI reporting and zero power CSI-RS (or subsampled CSI-RS or muted CSI-RS CSI-RS):

CRS REs are in non-multicast-broadcast single-frequency network (MBSFN) subframes. The CRS overhead is assumed to be the same as the CRS overhead corresponding to the number of CRS antenna ports of the serving cell;

The UE-specific reference signal overhead is consistent with the most recent reported rank for the CSI process if more than one CSI-RS port is configured, and is consistent with rank 1 transmission if only one CSI-RS port is configured; and PDSCH signals on antenna ports {7, . . . , 6+v} for v layers would result in signals equivalent to corresponding symbols transmitted on antenna ports (15, . . . , 14+P), as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping in subclause 6.3.3.2 of [REF3], P∈{1, 2, 4, 8, 16, 32, 64} is the sum of the number of antenna ports of the associated non-zero power CSI-RS resource and number of antenna ports of the associated zero power CSI-RS resource, and if P=1, W (i) is 1, otherwise W(i) is the precoding matrix corresponding to the reported PMI applicable to x(i). The corresponding PDSCH signals transmitted on antenna ports {15, . . . , 14+P} would have a ratio of EPRE to CSI-RS EPRE equal to the ratio given in subclause 7.2.5

Alt 2: CQI Derived Based on Subsampling/Downsampling Factor

If a CSI process is configured with PMI/RI reporting and zero power CSI-RS (or subsampled CSI-RS or muted CSI-RS or punctured CSI-RS):

CRS REs are as in non-MBSFN subframes. The CRS overhead is assumed to be the same as the CRS overhead corresponding to the number of CRS antenna ports of the serving cell;

The UE-specific reference signal overhead is consistent with the most recent reported rank for the CSI process if more than one CSI-RS port is configured, and is consistent with rank 1 transmission if only one CSI-RS port is configured; and PDSCH signals on antenna ports for layers would result in signals equivalent to corresponding symbols transmitted on antenna ports {7, . . . , 6+v} for v layers would result in signals equivalent to corresponding symbols transmitted on antenna ports {15, . . . , 14+P}, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping in subclause 6.3.3.2 of [REF3], P∈{1, 2, 4, 8, 16, 32, 64} is the number of antenna ports of the associated non-zero power CSI-RS resource and number of antenna ports of the associated zero power CSI-RS resource, and if P=1, W(i) is 1, otherwise W(i) is the precoding matrix corresponding to the reported PMI applicable to x(i). The corresponding PDSCH signals transmitted on antenna ports {15, . . . , 14+P} would have a ratio of EPRE to CSI-RS EPRE equal to the ratio given in subclause 7.2.5.

Assume no REs allocated CSI-RS.

Assume no REs allocated for PRS.

The PDSCH transmission scheme given by Table 7.2.3-0 depending on the transmission mode currently configured for the UE (which may be the default mode).

If CRS is used for channel measurements, the ratio of PDSCH EPRE to cell-specific RS EPRE is as given in subclause 5.2 with the exception of $\rho_A$ which shall be assumed to be $$\rho_A = P_A + \Delta_{offset} + 10\log_{10}(2) + \Delta_{subsample} \text{ [dB]}$$

for any modulation scheme, if the UE is configured with transmission mode 2 with 4 cell-specific antenna ports, or transmission mode 3 with 4 cell-specific antenna ports and the associated RI is equal to one;

$$\rho_A = P_A + \Delta_{offset} + \Delta_{subsample} \text{ [dB]}$$

for any modulation scheme and any number of layers, otherwise.

The shift $\Delta_{offset}$ is given by the parameter nomPDSCH-RS-EPRE-Offset which is configured by higher-layer signalling. The shift $\Delta_{subsample}$ is determined by the subsampling factor configured by the eNB. One example is:

| Subsampling factor | $\Delta_{subsample}$ |
|---|---|
| 1 | 0 |
| 2 | 3 |
| 4 | 6 |

In some embodiments, the UE derives PMI as follows:

For transmission modes 4, 5 and 6, precoding feedback is used for channel dependent codebook based precoding and relies on UEs reporting precoding matrix indicator (PMI). For transmission mode 8, the UE shall report PMI if configured with PMI/RI reporting. For transmission modes 9 and 10, the UE shall report PMI if configured with PMI/RI reporting and the number of CSI-RS ports is larger than 1. If CSI-RS subsampling/puncturing/subsampling is configured, the UE shall report PMI if configured with PMI/RI reporting and the sum of the number of non-zero power CSI-RS ports and zero-power CSI-RS ports is larger than 1, and the number of CSI-RS ports used to derive PMI/RI can be configured to be equal to the number of non-zero power CSI-RS ports or the sum of the number of non-zero power CSI-RS ports and zero-power CSI-RS ports. A UE shall report PMI based on the feedback modes described in 7.2.1 and 7.2.2 of 3GPP TS36.213. For other transmission modes, PMI reporting is not supported.

Figure 30:
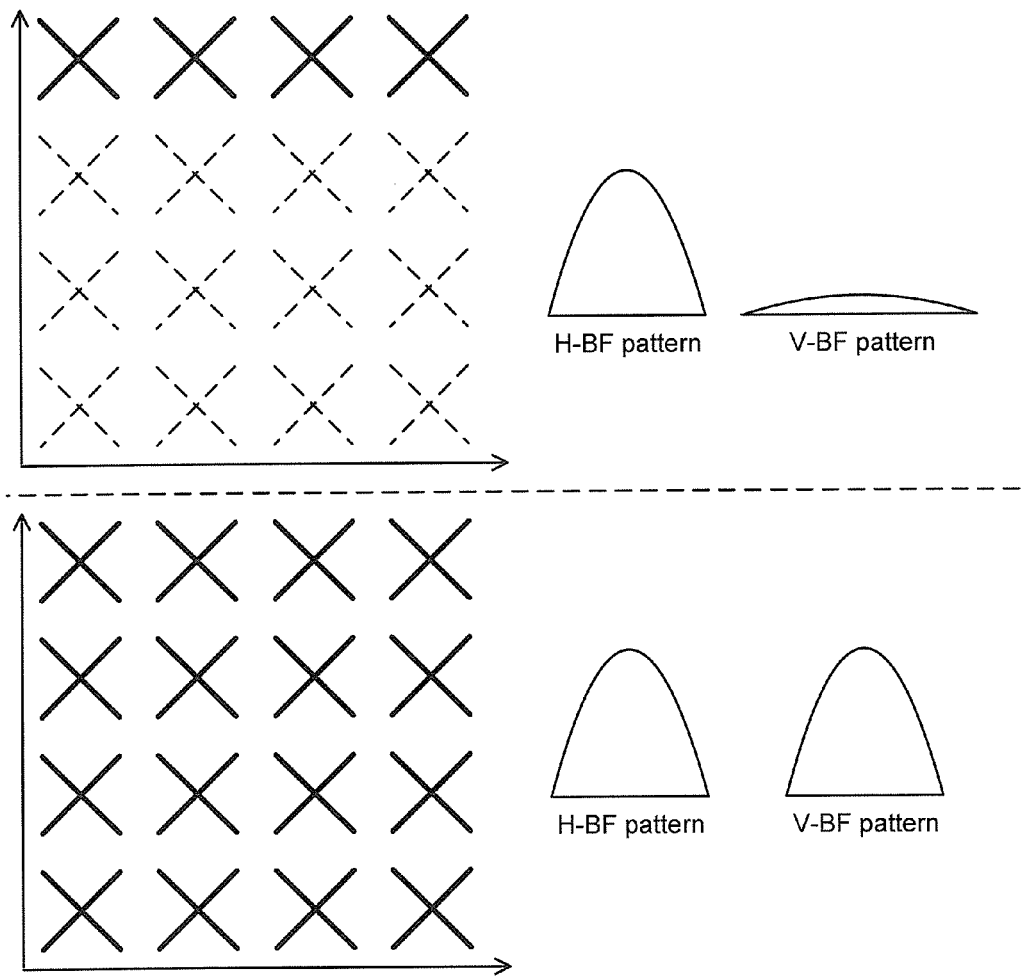
FIG. 30 illustrates the basis for channel quality information compensation when channel quality information is determined based upon antenna subsampling according to embodiments of the present disclosure.

FIG. 30 illustrates the basis for channel quality information compensation when channel quality information is determined based upon antenna subsampling according to embodiments of the present disclosure. The top portion of FIG. 30 illustrates one subsampling pattern discussed above, used to transmit CSI-RS. To the right are graphically depicted components of CQI (H-CQI, for the example under discussion) that would be determined based on the sub-sampled transmission of CSI-RS. The horizontal beamforming pattern (four horizontal antenna at one polarization) would realize about 6 dB of gain in the presence of applied antenna subsampling, while the vertical beamforming pattern (a single antenna) would realize little gain, or about 0 dB.

The bottom portion of FIG. 30 illustrates data transmission using the same antenna array, in which all antenna are used. With such transmission, the vertical beamforming pattern (four vertical antennas per polarization) matches the horizontal beamforming pattern (four horizontal antennas per polarization), and will therefore realize comparable gain of about 6 dB. On average, true SINR when all antennas are used for transmission will be 6 dB higher than the H-SINR due to the vertical beamforming gain, which is proportional to number of vertical antennas. Accordingly, out of a vertical CSI report, the V-PMI is used only to derive beamforming direction.

According to a proposed method in this disclosure, true CQI is derived or determined by adding 6 dB to the H-CQI. That is, in general for some embodiments of CSI process configurations, true CQI will equal H-CQI (dB)+3 $\log_2$ M, where M is the number of antennas per column (vertical dimension). In some embodiments of a CSI process configuration, trus CQI will equal V-CQI (dB)+3 $\log_2$ N, where N is the number of antennas per row (horizontal dimension). CQI compensation may thus be determined by adding a fixed amount, such as 6 dB, to the CQI determined based upon the subsampled transmission of CSI-RS.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment, comprising:
a receiver configured to receive subsampling parameters for antenna ports for antennas within an antenna array, the subsampling parameters corresponding to non-zero power channel state information reference signals (CSI-RSs) transmitted by a base station on a first subset of the antenna ports and zero power CSI-RSs for a second subset of the antenna ports;
a processor configured to determine channel state information (CSI) feedback for both the first and second subsets of antenna ports based on the sub-sampling parameters and the non-zero power CSI-RSs received for the first subset of antenna ports; and
a transmitter configured to transmit, to the base station, the determined CSI feedback for both the first and second subsets of antenna ports,
wherein the subsampling parameters include at least one bitmap for a set of predefined patterns of antennas within a two-dimensional (2D) antenna array corresponding to one of the non-zero power CSI-RSs or the zero power CSI-RSs and two subsampling factors configured for the 2D antenna array,
wherein a first of the subsampling factors corresponds to one pattern among a plurality of patterns of non-zero power CSI-RS ports on one dimension of the 2D antenna array, and a second of the subsampling factors corresponds to one pattern among a plurality of patterns of the non-zero power CSI-RS ports on another dimension of the 2D antenna array.

2. The user equipment according to claim 1, wherein, based on the subsampling parameters, resource elements corresponding to the second subset of antenna ports for zero power CSI-RSs are processed as containing physical downlink share channels (PDSCHs).

3. The user equipment according to claim 1, wherein the subsampling parameters further comprise at least two offsets, a first of the offsets relating to the non-zero power CSI-RS ports on the one dimension of the antenna array and a second of the offsets relating to the non-zero power CSI-RS ports on the other dimension of the antenna array.

4. The user equipment according to claim 1, wherein a channel quality indicator (CQI) portion of the CSI feedback is determined based upon adding an offset relating to a subsampling factor to a value determined based on the non-zero power CSI-RSs received for the first subset of antenna ports.

5. The user equipment according to claim 1, wherein the CSI feedback determined for both the first and second subsets of antenna ports based on the sub-sampling parameters and the non-zero power CSI-RSs received for the first subset of antenna ports is determined using one of linear interpolation, linear extrapolation, two dimensional (2D) minimum mean square error (MMSE) or combining CSI-RS ports for two CSI-RS processes to derive CSI feedback measures for the first and second subset of antenna ports.

6. A base station, comprising:
a transmitter configured to transmit
subsampling parameters for antenna ports for antennas within an antenna array, the subsampling parameters corresponding to non-zero power channel state information reference signals (CSI-RSs) for a first subset of the antenna ports and zero power CSI-RSs for a second subset of the antenna ports, and
the non-zero power CSI-RSs; and
a receiver configured to receive channel state information (CSI) feedback determined for both the first and second subsets of antenna ports based on the sub-sampling parameters and the non-zero power CSI-RSs received for the first subset of antenna ports,
wherein the subsampling parameters include at least one bitmap for a set of predefined patterns of antennas within a two-dimensional (2D) antenna array corresponding to one of the non-zero power CSI-RSs or the zero power CSI-RSs, and two subsampling factors configured for a 2D antenna array, wherein a first of the subsampling factors corresponds to one pattern among a plurality of patterns of non-zero power CSI-RS ports on one dimension of the 2D antenna array, and a second of the subsampling factors corresponds to one pattern among a plurality of patterns of the non-zero power CSI-RS ports on another dimension of the 2D antenna array.

7. The base station according to claim 6, wherein the subsampling parameters correspond to at least one of configuration of the first subset of antenna ports for the non-zero power CSI-RSs or configuration of the second subset of antenna ports for the zero power CSI-RSs.

8. The base station according to claim 7, wherein, based on the subsampling parameters, resource elements corresponding to the second subset of antenna ports for zero power CSI-RSs contain physical downlink share channels (PDSCHs).

9. The base station according to claim 6, wherein at least one set of the subsampling parameters per channel state information (CSI) process is configured.

10. The base station according to claim 6, wherein each set of subsampling parameters corresponds to at least one pattern corresponding to a two-dimensional (2D) antenna array, wherein the pattern is based upon one of alternating rows of the 2D antenna array, alternating columns of the 2D antenna array, or alternating non-adjacent antennas in both the rows and the columns of the antennas.

11. The base station according to claim 6, wherein one or more sets of the subsampling parameters are configured for use for all configured channel state information (CSI) processes.

12. The base station according to claim 9, wherein the subsampling parameters further comprise at least one of two offsets, a first of the offsets relating to the non-zero power CSI-RS ports on the one dimension of the antenna array and a second of the offsets relating to the non-zero power CSI-RS ports on the other dimension of the antenna array.

13. The base station according to claim 6, wherein the subsampling parameters include row indices of antennas within a two-dimensional (2D) antenna array corresponding to the non-zero power CSI-RSs, column indices of the antennas within the 2D antenna array corresponding to the non-zero power CSI-RSs, or both.

14. The base station according to claim 6, wherein the subsampling parameters include row indices of antennas within a two-dimensional (2D) antenna array corresponding to the zero power CSI-RSs, column indices of the antennas within the 2D antenna array corresponding to the zero power CSI-RSs, or both.

15. The base station according to claim 6, wherein the subsampling parameters include a bitmap for a set of predefined patterns of antennas within a two-dimensional (2D) antenna array corresponding to one of the non-zero power CSI-RSs or the zero power CSI-RSs.

16. A base station, comprising:
a transmitter configured to transmit channel state information reference signals (CSI-RSs) on a subset of antennas within an antenna array;
a receiver configured to receive channel state information (CSI) feedback for the non-zero power CSI-RSs, the CSI feedback including at least one of a channel quality indicator (CQI) or a precoding matrix indicator (PMI) based on the non-zero power CSI-RSs transmitted on the subset of antennas; and
a processor configured to determine at least one of a new CQI and a new PMI for all antennas within the antenna array based on at least one pattern of the subset of antennas within the antenna array and the received CSI feedback for the non-zero power CSI-RSs by one of PMI derivation or CQI derivation, wherein the subsampling parameters include at least one bitmap for a set of predefined patterns of antennas within a two-dimensional (2D) antenna array corresponding to one of the non-zero power CSI-RSs or the zero power CSI-RSs and two subsampling factors configured for the 2D antenna array, wherein a first of the subsampling factors corresponds to one pattern among a plurality of patterns of non-zero power CSI-RS ports on one dimension of the 2D antenna array, and a second of the subsampling factors corresponds to one pattern among a plurality of patterns of the non-zero power CSI-RS ports on another dimension of the 2D antenna array.

17. The base station according to claim 16, wherein the transmitter is configured to transmit the CSI-RSs according to each of first and second CSI-RS processes, wherein the first CSI-RS process is configured to transmit the CSI-RSs with a first antenna sub-sampling pattern and the second CSI-RS process is configured to transmit the CSI-RSs with a second antenna sub-sampling pattern.

18. The base station according to claim 16, wherein at least one antenna port for the antennas within the antenna array is virtualized by mapping of the at least one antenna port to multiple physical antennas within the antenna array.

19. The base station according to claim 16, wherein a pattern of the subset of antennas comprises any one of alternate horizontal rows of the antennas within the antenna array, alternate vertical columns of the antennas within the antenna array, or alternating antennas in each horizontal row and vertical column of the antennas within the array.

20. The base station according to claim 16, wherein the PMI derivation comprises at least one of discrete Fourier transform (DFT) linear interpolation or DFT linear extrapolation corresponding to estimation of at least one of horizontal phase progression, vertical phase progression or a co-phasing factor.

21. The base station according to claim 20, wherein the DFT linear interpolation and the DFT linear extrapolation each correspond to deriving a PMI value corresponding to a codeword associated with a longer codeword length than length of a codeword associated with a PMI value within the CSI feedback different.

22. The base station according to claim 16, wherein the CQI derivation comprises adding, to a value determined based on the CSI-RSs transmitted on the first subset of antennas within the antenna array, an offset relating to at least one pattern of antenna arrays on which the CSI-RSs are transmitted.

* * * * *